United States Patent [19]

Kimura et al.

[11] 4,190,007
[45] Feb. 26, 1980

[54] PROGRAMMING APPARATUS OF AUTOMATIC SEWING MACHINES

[75] Inventors: Koya Kimura, Numazu; Shinji Machi, Mishima; Takao Manabe, Shizuoka, all of Japan

[73] Assignee: Toshiba Kikai Kabushiki Kaisha, Tokyo, Japan

[21] Appl. No.: 913,022

[22] Filed: Jun. 6, 1978

[30] Foreign Application Priority Data

Jun. 14, 1977 [JP] Japan .................................. 52-70070

[51] Int. Cl.² .............................................. D05B 21/00
[52] U.S. Cl. .............................................. 112/121.12
[58] Field of Search ...................... 112/121.12, 121.11; 250/202, 566; 318/568

[56] References Cited

U.S. PATENT DOCUMENTS

| | | | |
|---|---|---|---|
| 3,810,414 | 5/1974 | Gerber | 112/121.12 X |
| 4,072,114 | 2/1978 | Sugiyama et al. | 112/121.12 |
| 4,073,247 | 2/1978 | Cunningham et al. | 112/121.12 |
| 4,116,143 | 9/1978 | Manabe | 112/121.11 |

Primary Examiner—Peter P. Nerbun
Attorney, Agent, or Firm—Koda and Androlia

[57] ABSTRACT

A sheet having marks corresponding to stitch positions along a sewing pattern curve is mounted on a programmer table. A stylus to be positioned at the mark is removably mounted on a movable member which is moved on the table in orthogonal directions by a pair of pulse motors. There are provided memory medium having a memory area for storing pulses applied to the pulse motors between two adjacent marks along the sewing pattern curve corresponding to at least one address, first control means including a ROM writer for transferring the content of the memory medium to a nonvolatile memory means such as ROM or PROM, second control means for reading the content of the memory medium or of the nonvolatile memory means for producing an instruction pulse train for moving the movable member by the pulse motors, and a cutting tool for forming a groove of said pattern curve through a cloth clamping plate mounted on the movable member by the second control means. The first and second control means are constituted by a microcomputer system.

13 Claims, 43 Drawing Figures

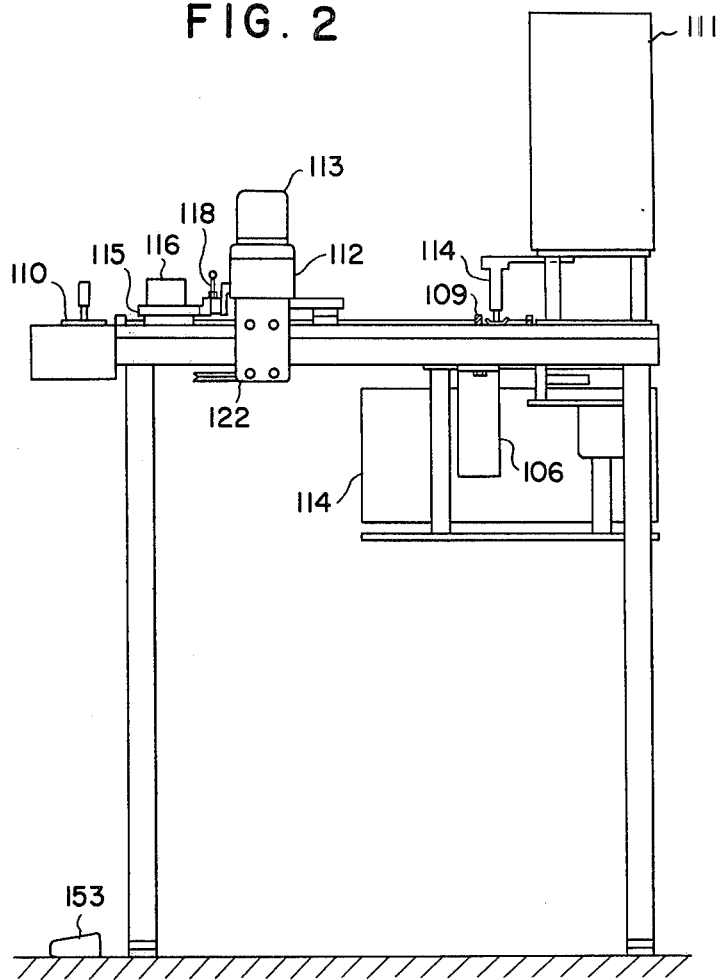

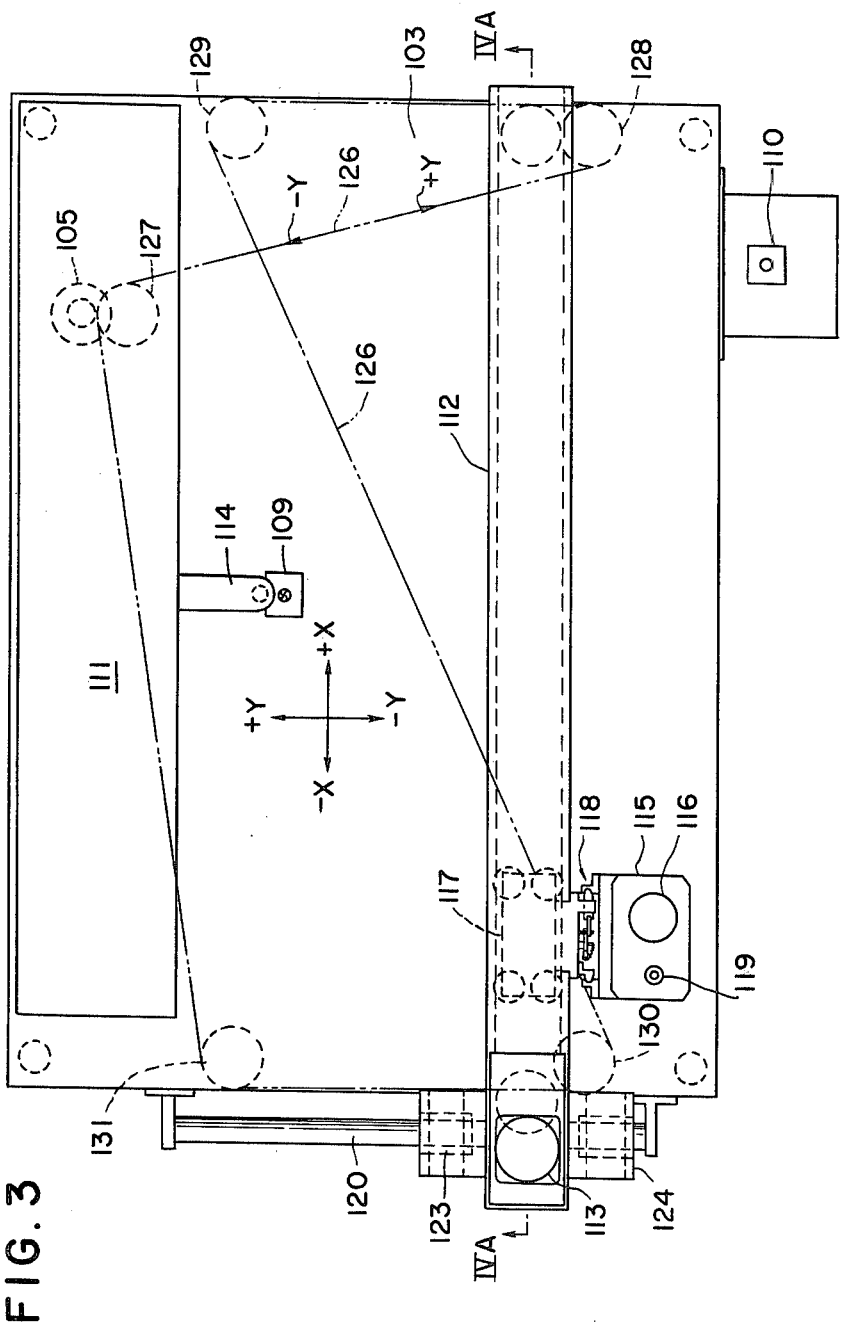

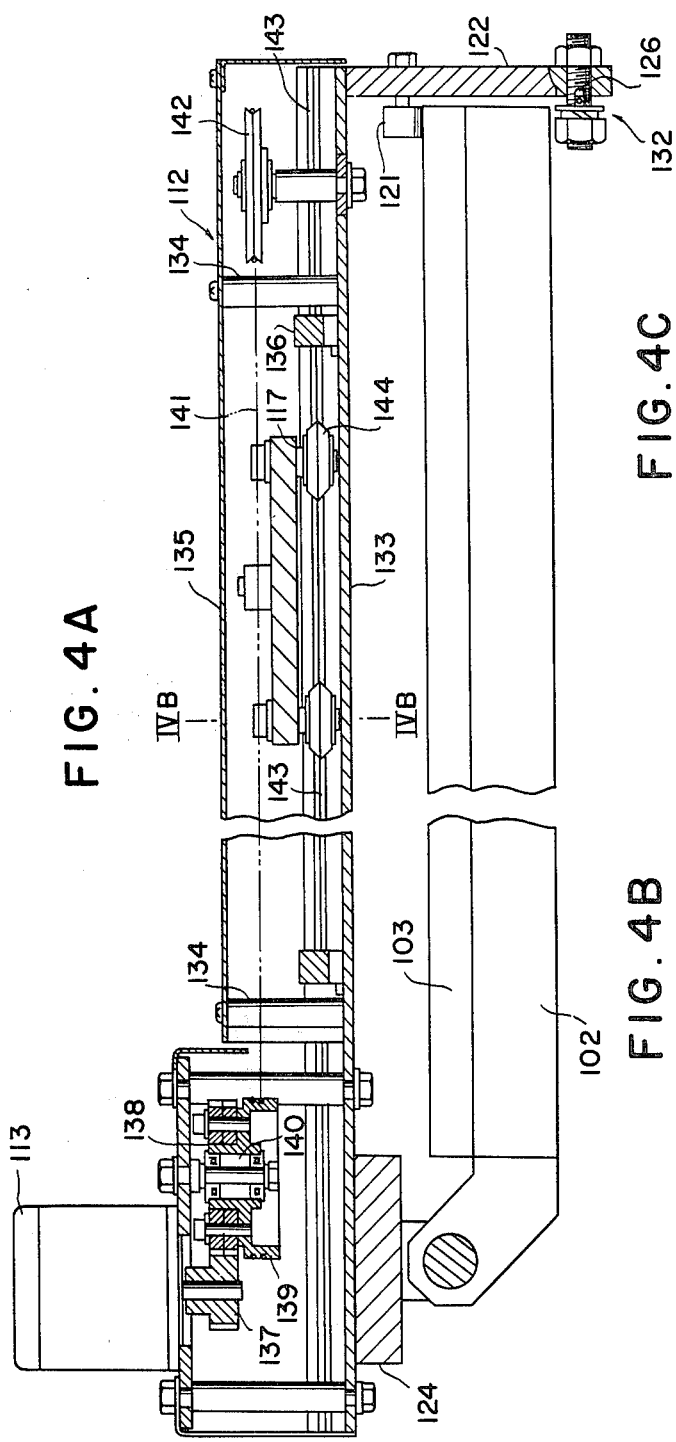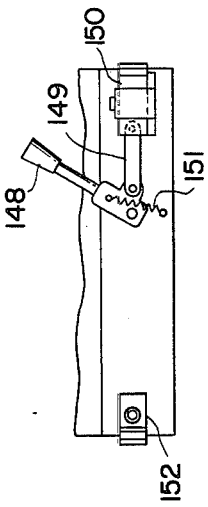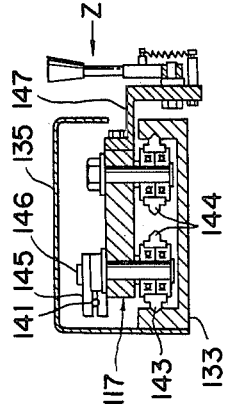

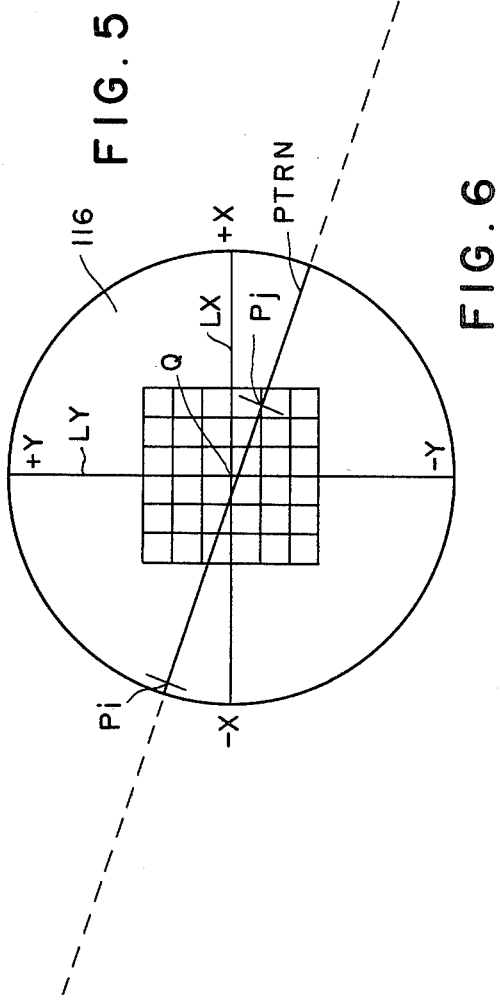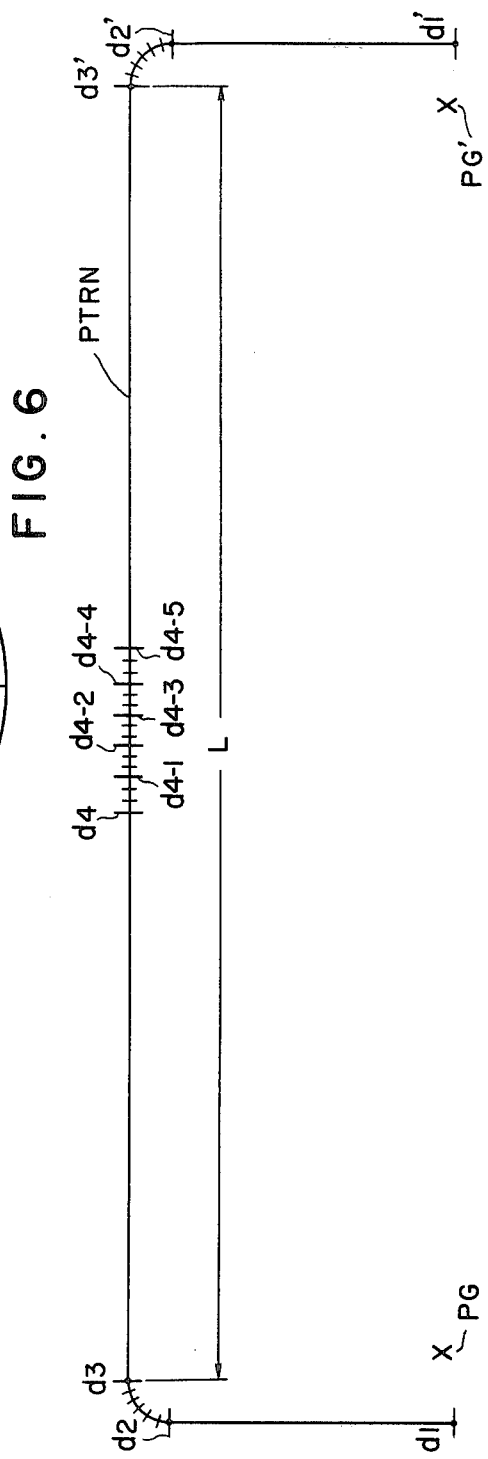

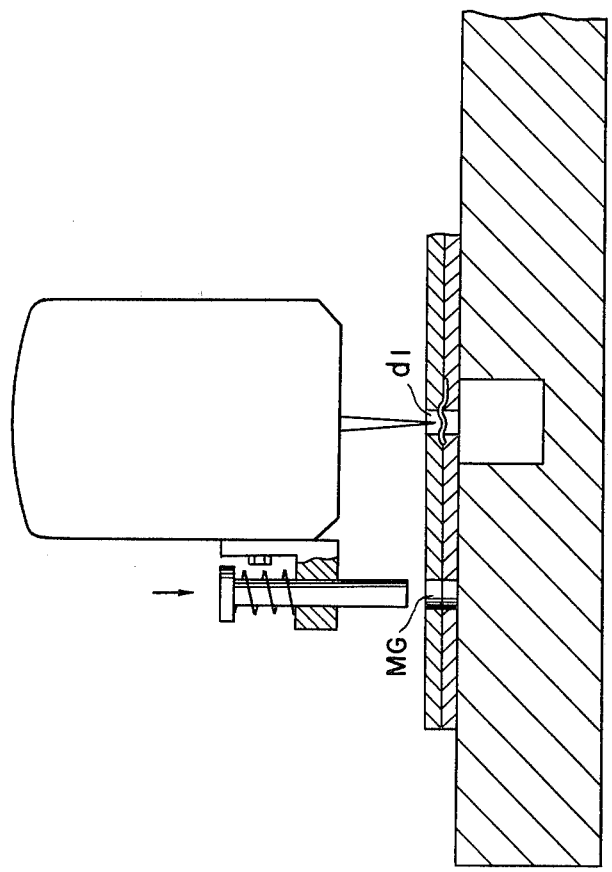

FIG. 8

| PROM NO. | (1) | | | | | | | | (2) | | | | | | | | (3) | | | | | | | |
|---|---|---|---|---|---|---|---|---|---|---|---|---|---|---|---|---|---|---|---|---|---|---|---|---|
| TYPE OF DATA | INDEX OF CONTROL | | | | CONTROL SIGNAL | | X SIGN | AMOUNT OF MOVEMENT IN X DIRECTION | | | | Y SIGN | AMOUNT OF MOVEMENT IN Y DIRECTION | | | | OPERATION NUMBER | | | | | | | |
| BIT NUMBER OF PROM | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| OUTPUT SIGNAL | D11 | D12 | D13 | D14 | D15 | D16 | D17 | D18 | D21 | D22 | D23 | D24 | D25 | D26 | D27 | D28 | D31 | D32 | D33 | D34 | D35 | D36 | D37 | D38 |
| REMARK | 0 0 0 0 (DATA CODE)    0 0 0 1 ~ 1 1 1 0 (MIRROR OR SKIP CODE)    1 1 1 0 (OPTIONAL STOP CODE)    1 1 1 1 (STOP CODE) | | | | "1" AT HIGH SPEED | "1" AT LOW SPEED | | 0 ~ 15 PULSES IN THE CASE OF SKIP CODE OPERATION NUMBER (MAX. 3) | | | | | 0 ~ 15 PULSES | | | | UPPER ORDER / LOWER ORDER MAXIMUM 99 | | | | | | | |

(OUTPUT SIGNALS CORRESPONDING TO RESPECTIVE ADDRESSES)

| ADDRESS | INDEX OF CONTROL | SEWING MACHINE CONTROL | X SIGN | AMOUNT OF MOVEMENT IN X DIRECTION | Y SIGN | AMOUNT OF MOVEMENT IN Y DIRECTION | OPERATION NUMBER DATA | REMARKS |
|---|---|---|---|---|---|---|---|---|
| 46 | 0 | 0 | 0 | 0 0 | 0 | 0 0 | 0000 0000 | FIRST MIRROR CODE [CUFF PATTERN] |
| 47 | 0 | 0 | 0 | 0 0 | 0 | 0 0 | 0000 0000 | |
| 48 | 0 | 0 | 0 | 0 0 | 0 | 0 0 | 0000 0000 | {POINTS d4-1~d4-5 REPRESENT POINTS OF DIFFERENT SIZES} |
| 49 | 0 | | | | | | | |
| 50 | 1 | | | | | | | |
| 51 ~ 100 | | | | | | | | PATTERN POCKET (SEE FIGS 16, 17) |
| 101 ~ 180 | | | | | | | | OTHER PATTERNS |

FIG. 17A

| OUTPUT OF ADDRESS COUNTER | INDEX OF CONTROL | | | | SEWING MACHINE CONTROL (HIGH) (LOW) | | SIGN X | AMOUNT OF MOVEMENT IN X DIRECTION | | | | SIGN Y | AMOUNT OF MOVEMENT IN Y DIRECTION | | | |
|---|---|---|---|---|---|---|---|---|---|---|---|---|---|---|---|---|
| (DECIMAL) | D11 | D12 | D13 | D14 | D15 | D16 | D17 | D18 | D21 | D22 | D23 | D24 | D25 | D26 | D27 | D28 |
| 51 | 1 | 1 | 1 | 1 | 0 | 0 | 0 | 0 | 0 | 0 | 0 | 0 | 0 | 0 | 0 | 0 |
| 52 | 0 | 0 | 0 | 0 | 0 | 0 | 0 | 1 | 1 | 1 | 1 | 0 | 0 | 0 | 0 | 0 |
| 53 | 1 | 1 | 1 | 0 | 0 | 0 | 0 | 0 | 0 | 0 | 0 | 0 | 0 | 0 | 0 | 0 |
| 54 | 1 | 0 | 0 | 1 | 1 | 0 | 1 | 1 | 0 | 1 | 0 | 0 | 0 | 0 | 0 | 0 |
| 55 | 1 | 0 | 1 | 0 | 0 | 1 | 1 | 0 | 0 | 0 | 1 | 1 | 1 | 1 | 1 | 1 |
| 56 | 1 | 0 | 1 | 1 | 1 | 1 | 0 | 1 | 1 | 1 | 1 | 0 | 0 | 0 | 0 | 0 |
| 57 | 1 | 1 | 1 | 0 | 0 | 0 | 0 | 0 | 0 | 0 | 0 | 0 | 0 | 0 | 0 | 0 |
| 58 | 0 | 0 | 0 | 0 | 0 | 1 | 0 | 0 | 0 | 0 | 0 | 0 | 0 | 0 | 0 | 0 |
| 59 | 0 | 0 | 0 | 0 | 1 | 0 | 0 | 0 | 0 | 0 | 0 | 0 | 1 | 0 | 1 | 0 |
| 60 | 0 | 0 | 0 | 0 | 1 | 0 | 1 | 0 | 1 | 0 | 0 | 0 | 1 | 0 | 0 | 0 |
| 61 | 0 | 0 | 0 | 0 | 1 | 0 | 1 | 0 | 1 | 0 | 1 | 0 | 0 | 1 | 0 | 1 |
| 62 | 0 | 0 | 0 | 0 | 1 | 0 | 1 | 1 | 0 | 0 | 0 | 0 | 0 | 1 | 0 | 0 |
| 63 | 0 | 0 | 0 | 0 | 1 | 0 | 1 | 1 | 0 | 1 | 0 | 0 | 0 | 0 | 0 | 0 |
| 64 | 0 | 0 | 0 | 1 | 1 | 0 | 0 | 0 | 0 | 0 | 0 | 0 | 0 | 0 | 0 | 0 |
| 65 | 0 | 0 | 0 | 0 | 0 | 0 | 0 | 1 | 1 | 1 | 1 | 0 | 0 | 0 | 0 | 0 |
| 66 | 1 | 1 | 1 | 0 | 0 | 0 | 0 | 0 | 0 | 0 | 0 | 0 | 0 | 0 | 0 | 0 |
| 67 | 0 | 0 | 0 | 0 | 0 | 0 | 1 | 0 | 1 | 0 | 1 | 0 | 0 | 0 | 1 | 0 |
| 68 | 1 | 1 | 1 | 0 | 0 | 0 | 0 | 0 | 0 | 0 | 0 | 0 | 0 | 0 | 0 | 0 |
| 69 | 0 | 0 | 0 | 0 | 0 | 0 | 0 | 0 | 0 | 0 | 0 | 0 | 1 | 1 | 1 | 1 |
| 70 | 1 | 1 | 1 | 0 | 0 | 0 | 0 | 0 | 0 | 0 | 0 | 0 | 0 | 0 | 0 | 0 |
| 71 | 0 | 0 | 0 | 0 | 0 | 0 | 1 | 1 | 0 | 1 | 0 | 0 | 0 | 1 | 0 | 1 |
| 72 | 1 | 1 | 1 | 0 | 0 | 0 | 0 | 0 | 0 | 0 | 0 | 0 | 0 | 0 | 0 | 0 |
| 73 | 0 | 0 | 0 | 0 | 0 | 0 | 1 | 0 | 1 | 0 | 1 | 1 | 1 | 0 | 1 | 0 |
| 74 | 1 | 1 | 1 | 0 | 0 | 0 | 0 | 0 | 0 | 0 | 0 | 0 | 0 | 0 | 0 | 0 |
| 75 | 0 | 0 | 0 | 0 | 0 | 0 | 0 | 0 | 0 | 0 | 0 | 1 | 1 | 1 | 1 | 1 |
| 76 | 1 | 1 | 1 | 0 | 0 | 0 | 0 | 0 | 0 | 0 | 0 | 0 | 0 | 0 | 0 | 0 |
| 77 | 1 | 0 | 0 | 1 | 1 | 0 | 1 | 1 | 0 | 1 | 0 | 0 | 0 | 0 | 0 | 0 |

FIG. 17B

| OUTPUT OF ADDRESS COUNTER | OPERATION NUMBER DATA | | | | | | | |
|---|---|---|---|---|---|---|---|---|
| (DECIMAL) | D31 | D32 | D33 | D34 | D35 | D36 | D37 | D38 |
| 51 | 0 | 0 | 0 | 0 | 0 | 0 | 0 | 0 |
| 52 | 0 | 0 | 0 | 0 | 0 | 1 | 0 | 1 |
| 53 | 0 | 0 | 0 | 0 | 0 | 0 | 0 | 0 |
| 54 | 0 | 0 | 1 | 0 | 0 | 1 | 0 | 1 |
| 55 | 0 | 0 | 1 | 1 | 0 | 0 | 0 | 0 |
| 56 | 0 | 0 | 0 | 1 | 0 | 0 | 0 | 0 |
| 57 | 0 | 0 | 0 | 0 | 0 | 0 | 0 | 0 |
| 58 | 0 | 0 | 0 | 0 | 0 | 0 | 0 | 1 |
| 59 | 0 | 0 | 0 | 0 | 1 | 0 | 0 | 0 |
| 60 | 0 | 0 | 0 | 0 | 0 | 0 | 0 | 1 |
| 61 | 0 | 0 | 0 | 0 | 0 | 0 | 0 | 1 |
| 62 | 0 | 0 | 0 | 0 | 0 | 0 | 0 | 1 |
| 63 | 0 | 0 | 0 | 0 | 0 | 0 | 1 | 1 |
| 64 | 0 | 0 | 0 | 0 | 0 | 0 | 0 | 0 |
| 65 | 0 | 0 | 0 | 1 | 0 | 1 | 0 | 1 |
| 66 | 0 | 0 | 0 | 0 | 0 | 0 | 0 | 0 |
| 67 | 0 | 0 | 1 | 0 | 0 | 1 | 0 | 1 |
| 68 | 0 | 0 | 0 | 0 | 0 | 0 | 0 | 0 |
| 69 | 0 | 0 | 0 | 1 | 0 | 0 | 0 | 0 |
| 70 | 0 | 0 | 0 | 0 | 0 | 0 | 0 | 0 |
| 71 | 0 | 0 | 0 | 1 | 0 | 1 | 0 | 1 |
| 72 | 0 | 0 | 0 | 0 | 0 | 0 | 0 | 0 |
| 73 | 0 | 0 | 0 | 1 | 0 | 1 | 0 | 1 |
| 74 | 0 | 0 | 0 | 0 | 0 | 0 | 0 | 0 |
| 75 | 0 | 0 | 0 | 1 | 0 | 0 | 0 | 0 |
| 76 | 0 | 0 | 0 | 0 | 0 | 0 | 0 | 0 |
| 77 | 0 | 0 | 1 | 0 | 0 | 0 | 0 | 0 |

FIG. 17C

| OUTPUT OF ADDRESS COUNTER (DECIMAL) | REMARKS |
|---|---|
| 51 | STOP CODE |
| 52 | PROGAM ORIGIN   PG → START POINT Q1 |
| 53 | OPTIONAL STOP |
| 54 | FIRST SKIP CODE  Q3→Q4, Q5→Q6 |
| 55 | SECOND SKIP CODE  Q7→Q8 |
| 56 | THIRD SKIP CODE  Q9→Q10, Q11→Q12, Q13→Q14 |
| 57 | OPTIONAL STOP CODE |
| 58 | STITCH  Q1 |
| 59 | STITCH  a1→a8 |
| 60 | STITCH  a9 |
| 61 | STITCH  a10 |
| 62 | STITCH  a11 |
| 63 | STITCH  a12, a13, Q2 |
| 64 | FIRST MIRROR CODE |
| 65 | PG → MG |
| 66 | OPTIONAL STOP |
| 67 | MG → h1 |
| 68 | OPTIONAL STOP |
| 69 | h1 → h2 |
| 70 | OPTIONAL STOP |
| 71 | h2 → h3 |
| 72 | OPTIONAL STOP |
| 73 | h3 → h4 |
| 74 | OPTIONAL STOP |
| 75 | h4 → h5 |
| 76 | OPTIONAL STOP |
| 77 | FIRST SIKP CODE  h5→h6, h7→h8 |

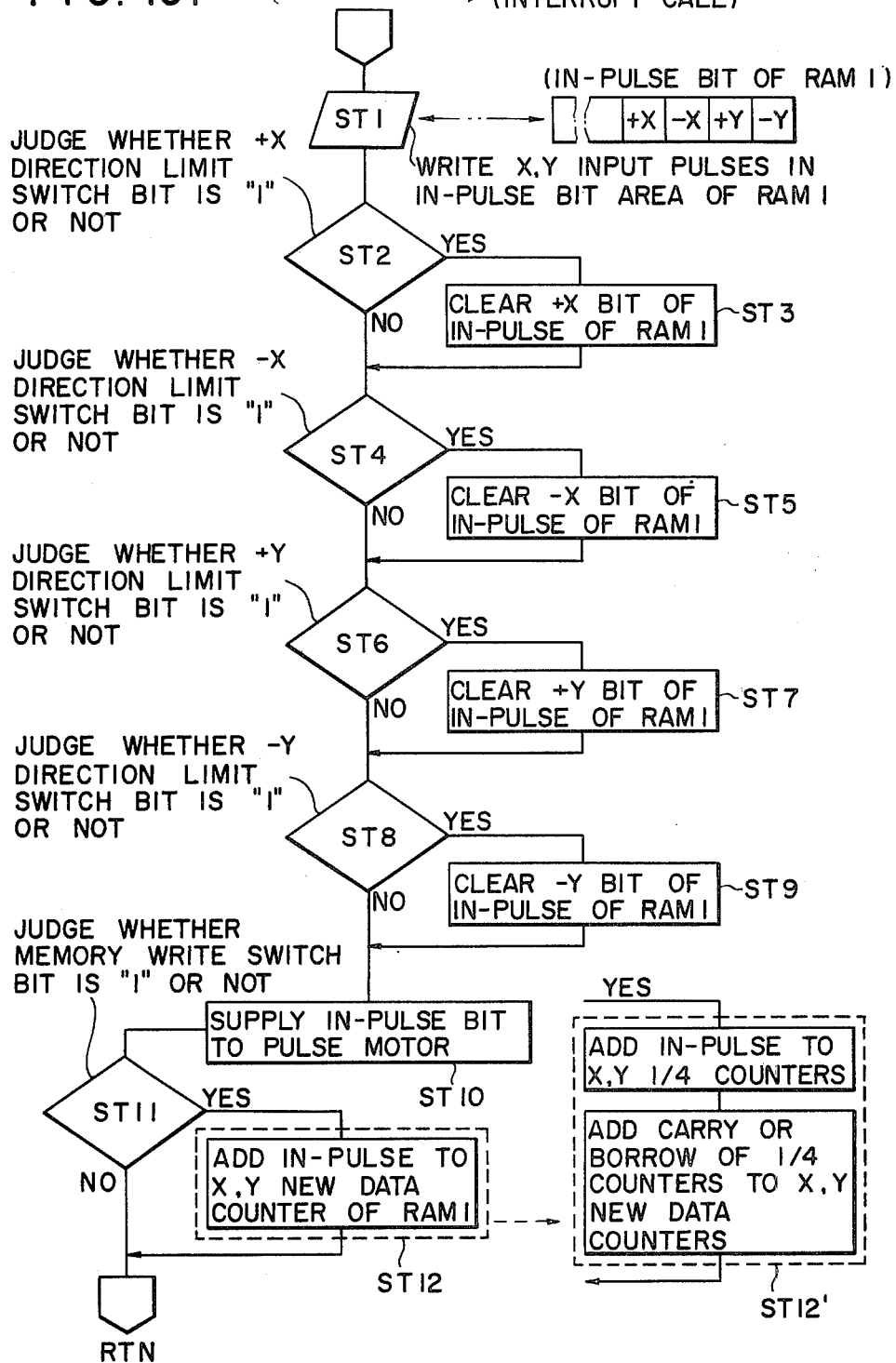

FIG. 22A
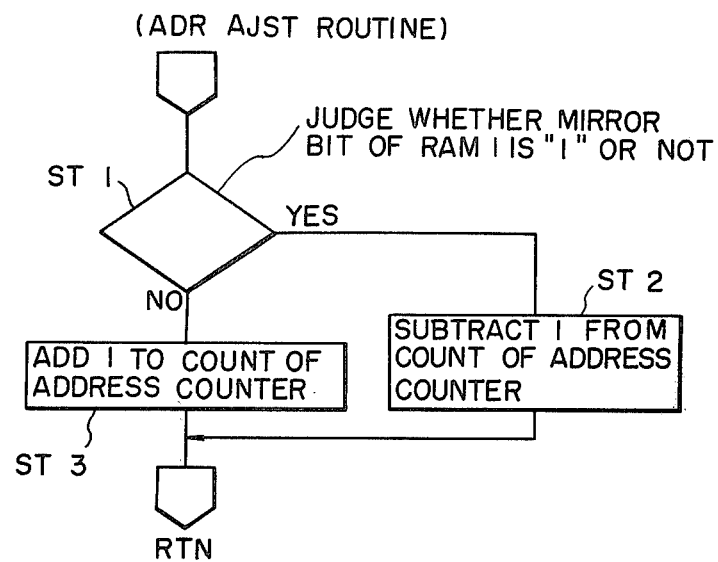
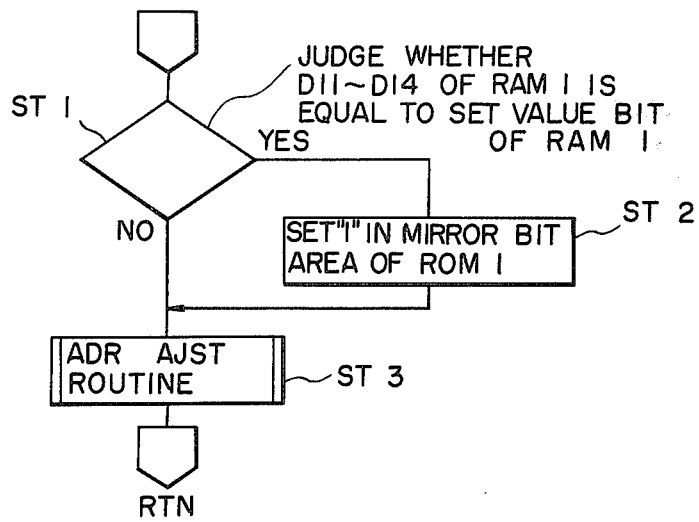

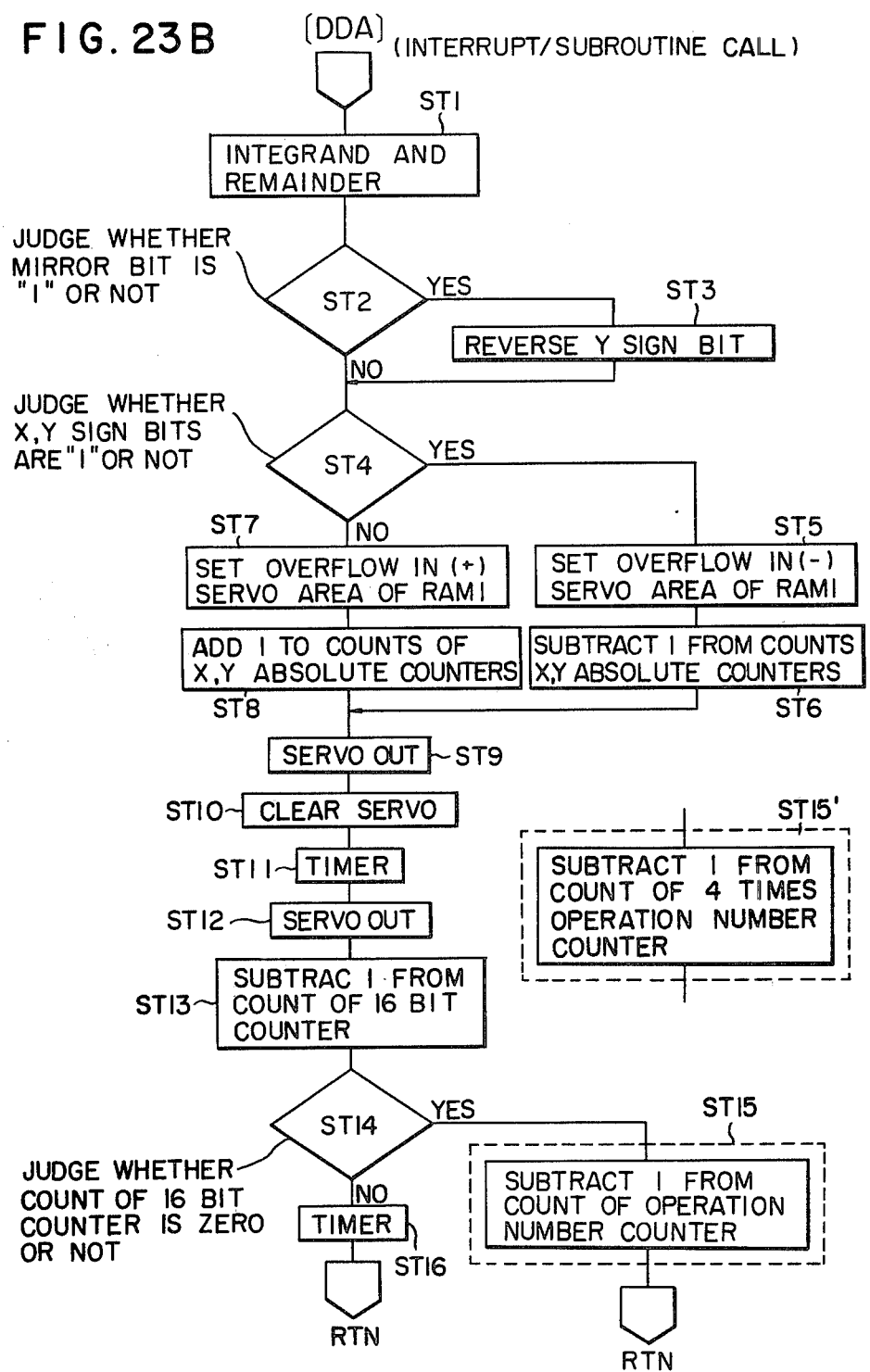

PROGRAMMING APPARATUS OF AUTOMATIC SEWING MACHINES

BACKGROUND OF THE INVENTION

This invention relates to programming apparatus of an automatic sewing machine, more particularly to programming apparatus of sewing patterns of an automatic sewing machine utilizing a microcomputer system.

An automatic sewing machine has already been proposed in which a random access memory device, for example, a programmable read only memory device (PROM) is set in the control device of the automatic sewing machine to sew such sewing patterns as the collar, cuff, etc., of a shirt by storing data regarding movement and sequence necessary to sew such sewing patterns in the memory device (Japanese Patent Application No. 19998/1977).

The applicant has also developed a control system in which the control device disclosed in said patent application is substituted by a microcomputer and sewing pattern grooves and openings are formed through cloth clamping plates mounted on the table of the sewing machine by using a tool controlled by a programmed PROM or a read only memory device (RAM) (Japanese Patent Application No. 43803/1977). The clamping plates are used to clamp therebetween pieces of cloth to be sewed and are intermittently moved in the X and Y directions of rectangular coordinates on the table of the sewing machine, for example, by pulse motors.

According to the invention disclosed in the Japanese Patent Application No. 43803 /1977, it is possible to perform programming of the memory device and the machining of the cloth clamping plate on the same sewing machine table in addition to the ordinary sewing operations. However sewing machines constructed to perform these three functions are not only relatively expensive, and programming and machining operations on the table decreases the utilization efficiency of the sewing machine. For this reason, the customers often demand sewing machines designed to perform only the programmed sewing operations. Such demands are caused by the following problems.

A. Where the cloth clamping plates are machined on the sewing machine table, it is necessary to suitably treat the chips.

B. Where an automatic sewing machine and programming device are purchased as a set, since the time required for the sewing operation is much longer than that for the programming operation, the advantages to the purchaser who individually possesses the programming device would be greatly diminished.

C. The automatic sewing machine is designed such that the cloth clamping plates are moved 0.2 mm per one pulse of the energizing current of the clamping plate driving motor. Even when the feed speed is decreased at the time of machining a pattern groove through the cloth clamping plate, the movement per pulse is still maintained at 0.2 mm so that such intermittent movement causes breakage of the cutting tool. Where it is desired to machine a narrow groove which is necessary to improve the finishing of the sewed products it is necessary to use a thin tool, end mill for example. Accordingly, the tool would be damaged when it is fed intermittently at a rate of 0.2 mm per pulse.

D. Although it is possible to mount a tool on the head of the sewing machine for machining the cloth clamping plate and to perform the programming operation of the PROM at a place remote from the sewing machine, most of the purchasers desire to be supplied with a set of the programmed PROM and cloth clamping plates formed with sewing patterns. In other words, they wish to perform only the sewing operations.

SUMMARY OF THE INVENTION

Accordingly, it is an object of this invention to provide an improved programming apparatus which is independent of an automatic sewing machine and can not only prepare a sewing program of any desired sewing pattern but also work a cloth clamping plate on the plate of the programming apparatus.

Another object of this invention is to provide a programming apparatus of an automatic sewing machine utilizing a microcomputer so that it is possible to scribe a pattern contour stored in a memory device and to compare the scribed pattern contour with the original pattern utilized for programming.

Still another object of this invention is to provide a programming apparatus for an automatic sewing machine which can form a groove of a desired sewing pattern through a cloth clamping plate such that when the cloth clamping plate is used on the sewing machine, the needle always moves along the center line of the groove.

Yet another object of this invention is to provide a programming apparatus utilizing a stylus in the form of a magnifying lens constructed to assure easy and accurate positioning of the stylus.

According to this invention, there is provided a programming apparatus of an automatic sewing machine comprising a programmer table for a sheet member provided with marks at portions corresponding to stitch portions along a sewing pattern curve, a movable member having a connecting member for removably mounting a stylus which is to be positioned at the marks of the sheet member on the table, drive means including pulse motors for moving the movable member on the table in the X and Y directions of rectangular coordinates, pulse generating means for generating pulses supplied to the pulse motors, recording medium including a memory area for storing a number of pulses which are applied to the pulse motors between adjacent ones of the marks along the pattern curve corresponding to at least one address, first control means including a ROM writer for transferring the content of the memory medium to a nonvolatile memory means, second control means for reading the content of the memory medium or of the nonvolatile memory means for producing an instruction pulse train to relatively move the movable member along the pattern curve, circuit means for supplying the instruction pulse train to the pulse motors, and means for forming a pattern contour on a cloth clamping plate by the operation of the second control means while the cloth clamping member is being mounted on the movable member by the connecting member.

BRIEF DESCRIPTION OF THE DRAWINGS

In the accompanying drawings:

FIG. 2 is a righthand side view of the apparatus shown in FIG. 1;

FIG. 3 is a plan view of the apparatus shown in FIGS. 1 and 2;

FIG. 4A is a longitudinal sectional view taken along a line IVA—IVA in FIG. 3;

FIG. 4B is a cross-sectional view taken along a line IVB—IVB in FIG. 4A;

FIG. 4C is a side view of the portions shown in FIG. 4B as seen in the direction of Z;

FIG. 5 is a plan view showing the detail of the grid portion near the cross-point of a magnifying lens;

FIG. 6 shows one example of a sewing pattern of a cuff of a shirt;

FIG. 7B is a sectional view showing the relationship between the working origin MG of a cloth clamping plate and a pin provided for the sewing machine;

FIG. 8 is a chart showing the output signals of the PROM;

FIGS. 15A, 15B and 15C are tables showing the data utilized to work the cloth clamping plate shown in FIG. 7A;

FIGS. 17A and 17B are tables showing data for working the cloth clamping plate shown in FIG. 16;

FIGS. 19A-19F are flow charts showing the operation steps for programming data regarding the sewing pattern by the programming apparatus of this invention;

FIG. 22A shows the address adjusting routine and the mirror routine

FIG. 23B shows the DDA routine; and

DESCRIPTION OF THE PREFERRED EMBODIMENT

Figure 1:
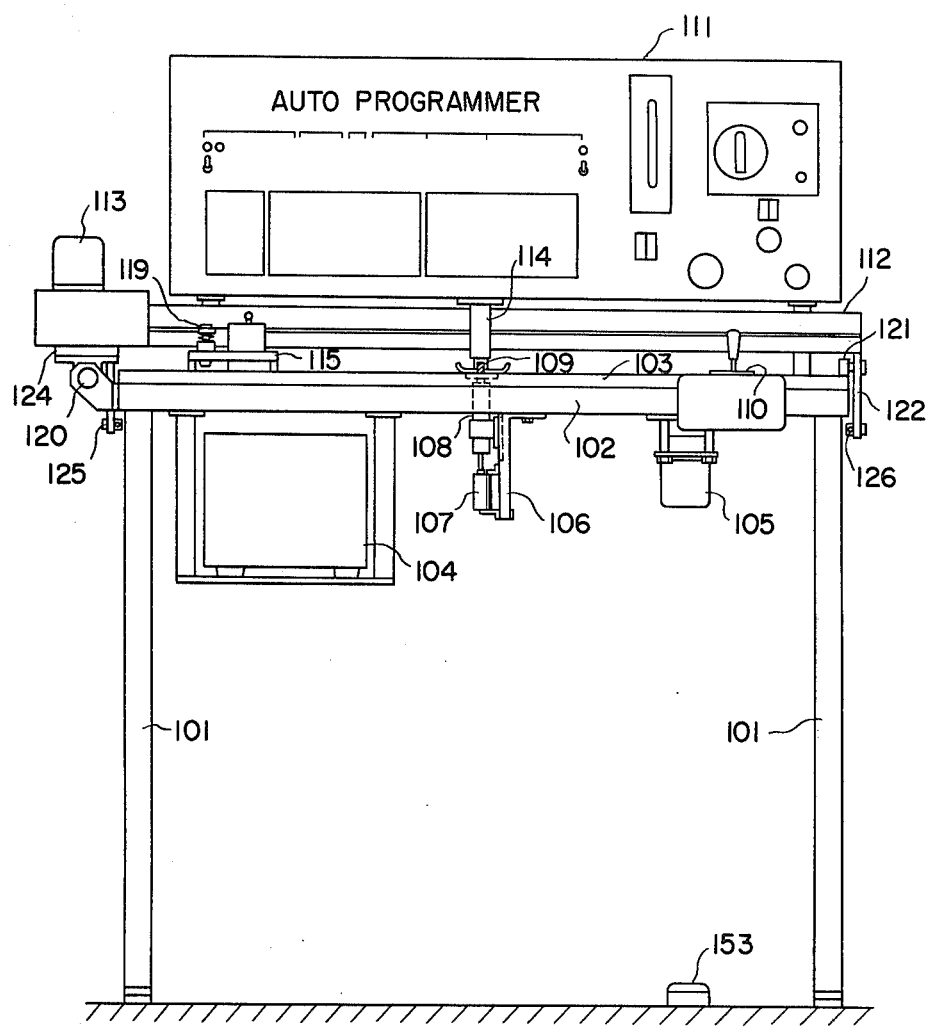
FIG. 1 is a front view of one embodiment of programming apparatus according to this invention.

The programming apparatus of this invention shown in FIGS. 1, 2 and 3 comprises vertical legs 101, a table support 102 supported by the legs and a programmer table 103 mounted on the table support 2. Depending from the table support 2 are a pulse motor drive unit 4 and a Y axis pulse motor 105. A support 6 is secured to the center of the lower surface of the table support 2, and a pneumatic rotary machine tool 108 operated in the vertical direction by piston-cylinder assemblies 107 is secured to the lefthand side of the support 106. In the example shown, the machine tool 108 comprises an end mill 109 as shown in FIGS. 2 and 3. A joy stick 110 is mounted on the front side of the programmer table.

To the rear side of the programmer table 103 is disposed a program panel unit 111, and a Y table 112 movable in Y direction of rectangular coordinates in a plane slightly above the surface of table 103 is disposed in front of panel 111. An X axis (of rectangular coordinates) pulse motor 113 is mounted on the lefthand end of Y table 112 as viewed in FIG. 1. A press member 114 for holding a cloth clamping plate is secured to the lower side of the panel unit 111 at the center thereof. The detail of the press member 114 will be described later with reference to FIG. 14.

A stylus 115 having a magnifying lens 116 provided with criss-cross wires, not shown, at the center is removably supported by a chuck 118 of a movable member 117 which moves on the Y table 112 in X direction as shown in FIG. 3.

A plotting instrument 119 is mounted on the stylus 115 such that it describes a point on the programmer table 103 when depressed from above. As shown in FIGS. 1 and 3, the lefthand end of Y table 112 is guided by a guide rod 120 and at its righthand end, a roller 121 supported by a supporting plate 122 is disposed to roll on the programmer table 103 (see FIG. 4). A bearing member 124 is secured to the lower side of the Y table at its lefthand end and bearing bushings 123 for journalling the guide rod 120 are contained in the bearing member.

As shown in FIG. 1 the bearing member 124 is provided with a downwardly extending supporting plate 125, and similar supporting plate 122 is secured to the righthand end of the Y table 112. Clamping members 132 including spring washers and nuts for clamping the opposite ends of a cord or rope 126 (see FIG. 3) are mounted on the lower portions of the supporting plates 122 and 125 (see 132 and 126 shown in FIG. 4A). Accordingly, when pulley 127 shown in FIG. 3 is rotated in +Y direction by Y axis pulse motor 105, the mounting plates 122 and 125 secured to Y table 112 are rotated in the +Y direction by a driving mechanism made up of pulleys 128, 129, 130 and 131 and cord 126.

As shown in FIG. 4A, the Y table 112 has an inverted dish shaped bottom plate 133 mounted on the supporting plate 122, the bearing member 124, and a cover 135 supported by posts 134. A proximity switch 136 is mounted on the bottom plate 136 to produce an electric signal when the movable body reaches its limit of movement. Although not shown, a similar proximity switch is provided to limit the movement in the Y direction. A pinion 137 is mounted on the output shaft of X axis pulse motor 113 to mesh two gears 138 which are used to eliminate backlash, and a pulley 139 is rotatably mounted on shaft 140 secured to the gears 138. A cord 141 for providing X axis movement is passed about pulleys 139 and 142. As shown in FIG. 4B, 4 rollers 144 are provided to roll through V-shaped grooves 143 formed on the inner surfaces of both side walls of the bottom plate 133, and upper and lower clamping plates 145 are secured to the upper surface of the bottom plate by screws 146 for fastening the cord 141 to the movable body 117.

Reference numeral 153 shown in FIG. 1 designates a foot switch utilized in the programming operation to be described later. A toggle mechanism including a lever 148, a link 149, a slidable member 150 and a spring 151 is mounted on a mounting plate 147 secured to the front surface of the movable body 117. A member 152 having a tapered end and constituting one side of the chuck 118 (FIGS. 2 and 3) is secured to one end of the supporting plate. The ends of members 152 and 150 are press fitted into corresponding members of the stylus 115 shown in FIG. 1.

To move the movable body 117 shown in FIG. 4A in the X direction, the peripheral length ($\delta$/pulse) of the pitch circle of gear 136 driven by X axis pulse motor 113 when it is supplied with one pulse is made to be equal to the movement $\delta x$ in the X direction of the movable body 117, in other words, the diameter of the pulley 139 about which the cord 141 is wound is made to be equal to the diameter of the pitch circle of gear 138. In this example, $\delta$/pulse is made to be equal to 0.2 mm so that the number of pulses produced by the PROM programmed by the programmer of this invention is determined such that one pulse will cause a movement of 0.2 mm of the cloth clamping member. As will be described later, where it is desired to make the movement $\delta x$ of the movable body 117 caused by one pulse applied to X axis pulse motor 113 to be smaller (for example, $\delta x = 0.05$ mm) than the movement (0.2 mm) per pulse on the automatic sewing machine the gear train (138,139) should have a gear ratio of $\frac{1}{4}$. Moreover, it is necessary to use pulse motor 113 having a small resolution. The above is true for the movement in the direction of Y axis.

As shown in FIG. 5, to use the stylus 115 shown in FIG. 3, the cross-point Q of the criss-cross lines LX and LY of the magnifying lens 116 is aligned with marks Pi and Pj (stitching positions) on a sewing curve PTRN on the programmer table 103. To this end, the stylus 115, hence the cross-point Q is moved by the manipulation of joy stick 110. However, to make easy the final aligning operation, it is advantageous to form grid lines near the cross-point Q having spacings corresponding to the amount of movement per pulse (0.2 mm) on the automatic sewing machine. In FIG. 5, a rough position alignment is made so as to bring the mark Pj into the area of the grid and then the stylus 115 (magnifying lens 116) is moved 2 pulses in the +X direction and one pulse in the −Y direction so as to bring the cross-point Q close to mark Pj. The coordinate values of Q at this time are stored in the PROM.

Figure 15A:
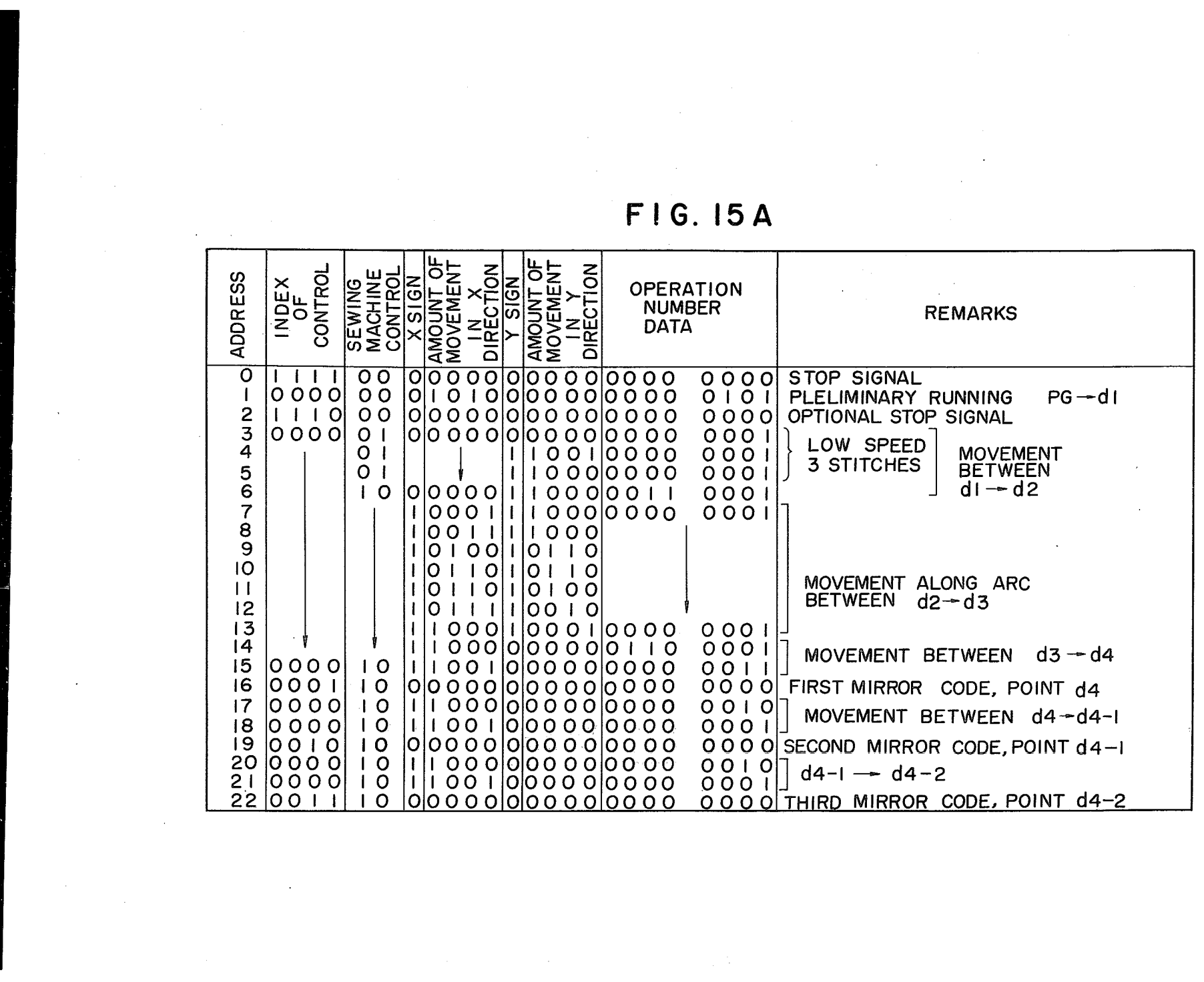
Figure 15B:
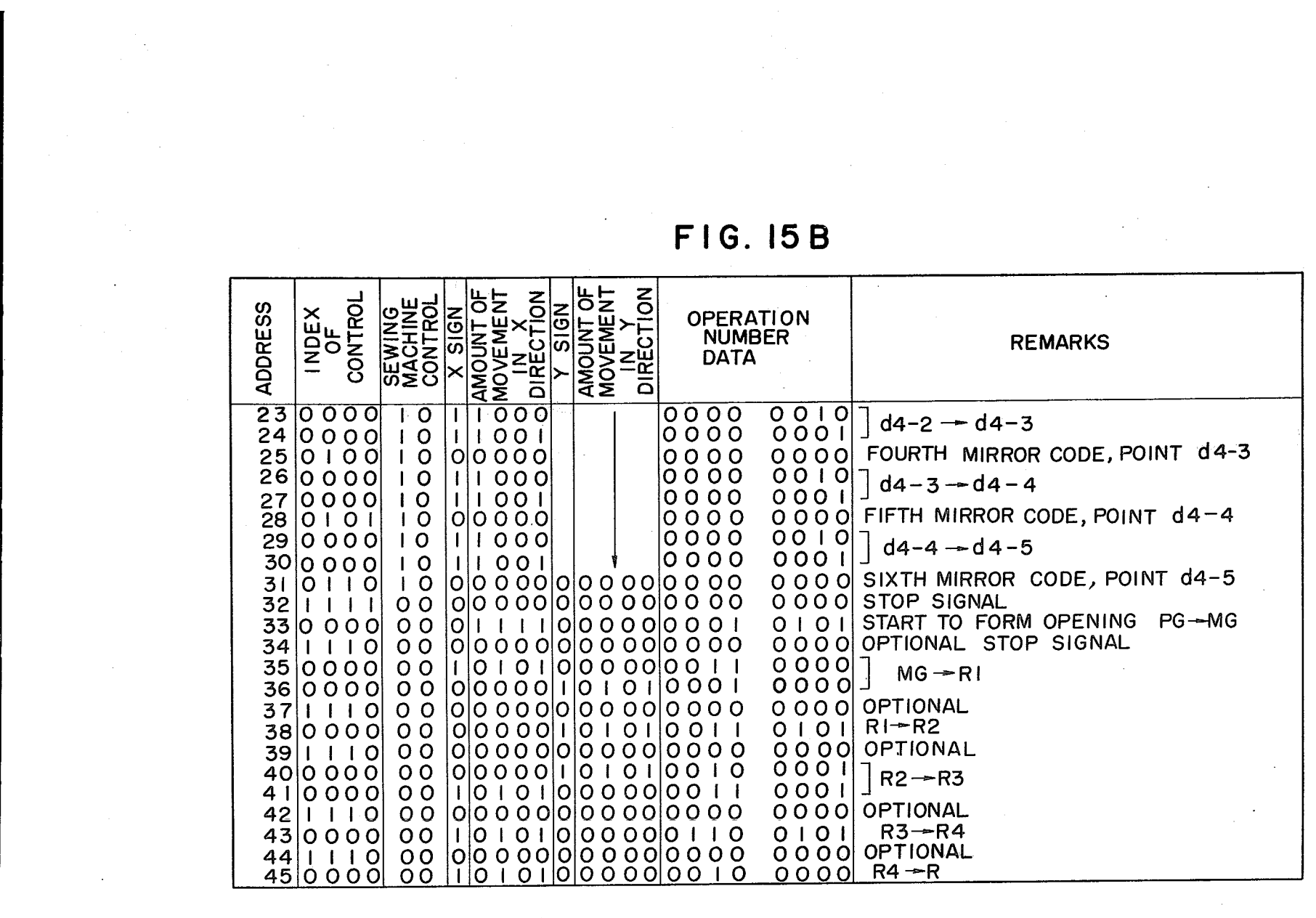

FIG. 6 shows a sewing pattern of a shirt cuff which is symmetrical with respect to the center. The length L ($d_3$—$d_3'$) at the central portion varies depending upon the size. Assume now that there are six sizes, and that one half of the length L varies as $\overline{d_3 \cdot d_4}$, $\overline{d_3 \cdot d_4}_{-1}$, $\overline{d_3 \cdot d_4}_{-2}$, $\overline{d_3 \cdot d_4}_{-3}$, $\overline{d_3 \cdot d_4}_{-2}$, $\overline{d_3 \cdot d_4}_{-3}$, $\overline{d_3 \cdot d_4}_{-4}$, and $\overline{d_3 \cdot d_4}_{-5}$. There are 34 stitch positions along a straight line between points $d_1$ and $d_2$ (including these points) whereas there are 7 stitch positions between points $d_2$ and $d_3$. Along a straight section (segment) between points $d_2$ and $d_3$ there are 64 stitch positions (61 at a sewing pitch of 1.6 mm, and 3 at a sewing pitch of 1.8 mm) whereas between points $d_4$ and $d_{4-1}$ there are 3 stitch positions (2 at 1.6 mm and 1 at 1.8 mm). Stitchings are performed in the same manner up to point $d_{4-5}$. The detail of these sewing data is shown in FIGS. 15A and 15B.

Figure 7A:
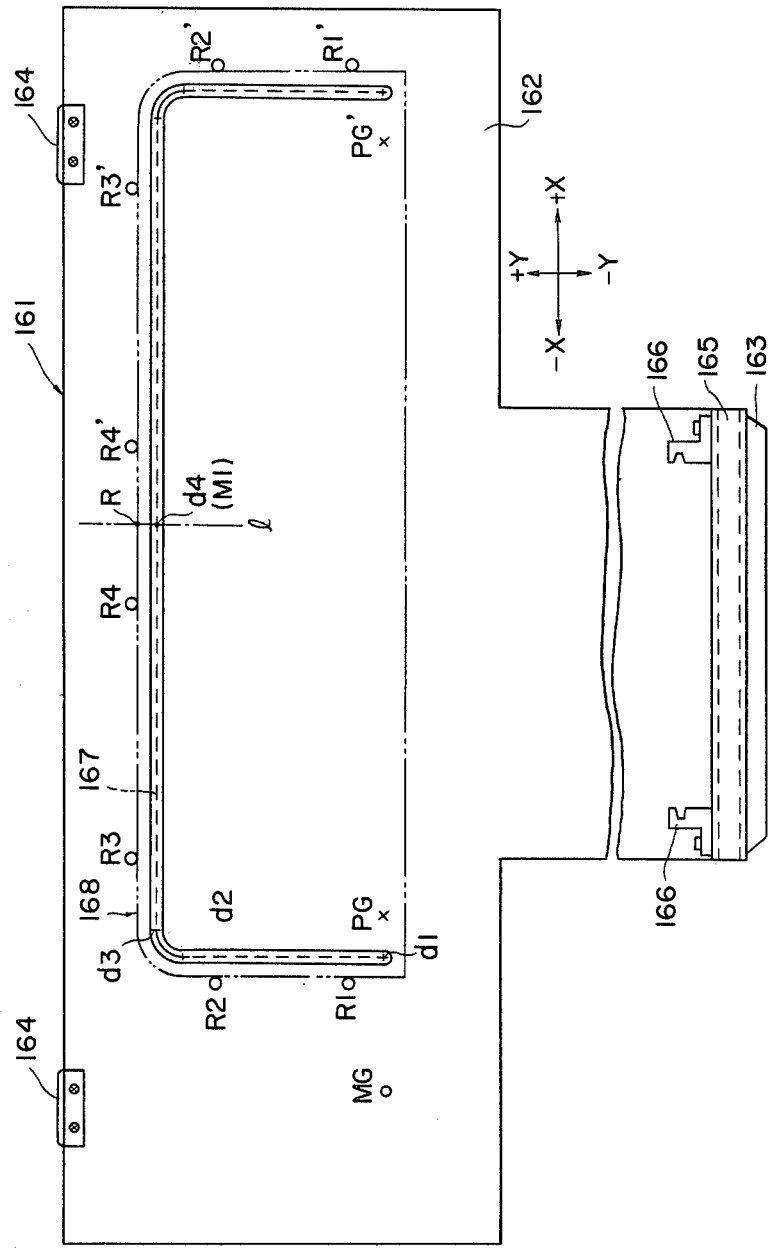
FIG. 7A is a plan view showing a cloth clamping plate formed with a pattern groove for sewing a cuff and openings.

FIG. 7A is a plan view showing a clamping plate 161 for clamping a piece of cloth cut to sew a cuff as shown in FIG. 6. The clamping plate 161 comprises two plates 162 and 163 hinged at 164 so that the lower plate 163 may be opened downwardly. An upper angle frame 165 is secured to plate 162 and anchors 166 adapted to be urged against the chuck 118 of the movable body 117 (FIG. 3) are secured to the opposite ends of the angle frame 165 so as to be removable in the same manner as the stylus 115.

A stitching groove 167 is formed through the upper and lower plates 162 and 163 along a sewing pattern (shown by dotted lines in the groove). Assume now that the axial center of the groove 167 corresponds to one of 6 sizes having the shortest length $\overline{d_3 \cdot d_4}$. Portion 168 shown by dot and dash lines 168 represents a piece of cloth for sewing a cuff and clamped between plates 162 and 163. Pins are inserted in openings $R_1$, $R_2$, $R_3$, $R_4$, $R_4'$, $R_2'$, and $R_1'$, of the lower plate 163 to assist positioning of the cloth piece 168 on the lower plate 163. An opening is formed at the working origin MG for receiving a pin for bringing the needle just above a sewing start point $d_1$ on the table of the sewing machine. This construction is shown by FIG. 7B. In FIG. 7A, point PG designates a program origin, point $d_4$ ($M_1$) the center position of the groove and R the axis of symmetry between opening positions $R_1$, $R_2$, $R_3$, $R_4$ and $R_4'$, $R_3'$, $R_2'$ and $R_1'$. The machining program of groove 167, points MG and $R_1$-$R_1'$ is shown in FIG. 15.

FIG. 8 shows the output bits of PROM. In this example, three ROMS (PROM(1), PROM(2), PROM(3)) are used. Each PROM is constructed to read output signals by the same 8 bit address signal. In PROM(1), the type of control (INDEX OF CONTROL) corresponding to output signals $D_{11}$-$D_{14}$, sewing machine control corresponding to output signals $D_{15}$ and $D_{16}$, a X code corresponding to $D_{17}$ showing the direction of movement, and the fourth bit of the amount of movement of X axis corresponding to output $D_{18}$ are defined. In the same manner, in PROM(2) are defined the remaining three bits of the amount of movement of X axis corresponding to $D_{21}$-$D_{23}$, a Y code corresponding to $D_{24}$, and four bits of the amount of movement of Y axis corresponding to $D_{25}$-$D_{28}$. In PROM(3) 8 bits of $D_{17}$-$D_{28}$ define the operation number data (showing the number of repetition of X; y movement pattern) by two digit BCD code. In the index of control, a data code is defined when outputs $D_{11}$-$D_{14}$ are 0000, a stop code is defined when the outputs are 1111, an optional stop code is defined when the outputs are 1110, and a mirror code (or skip code) is defined when the outputs are 0001-1101. In the following example, description is made by separating 0001-1000 into 8 mirror codes and by separating 1001-1101 into 5 skip codes. The detail of the contents of these codes will become clear as the description proceeds.

Figure 9A:
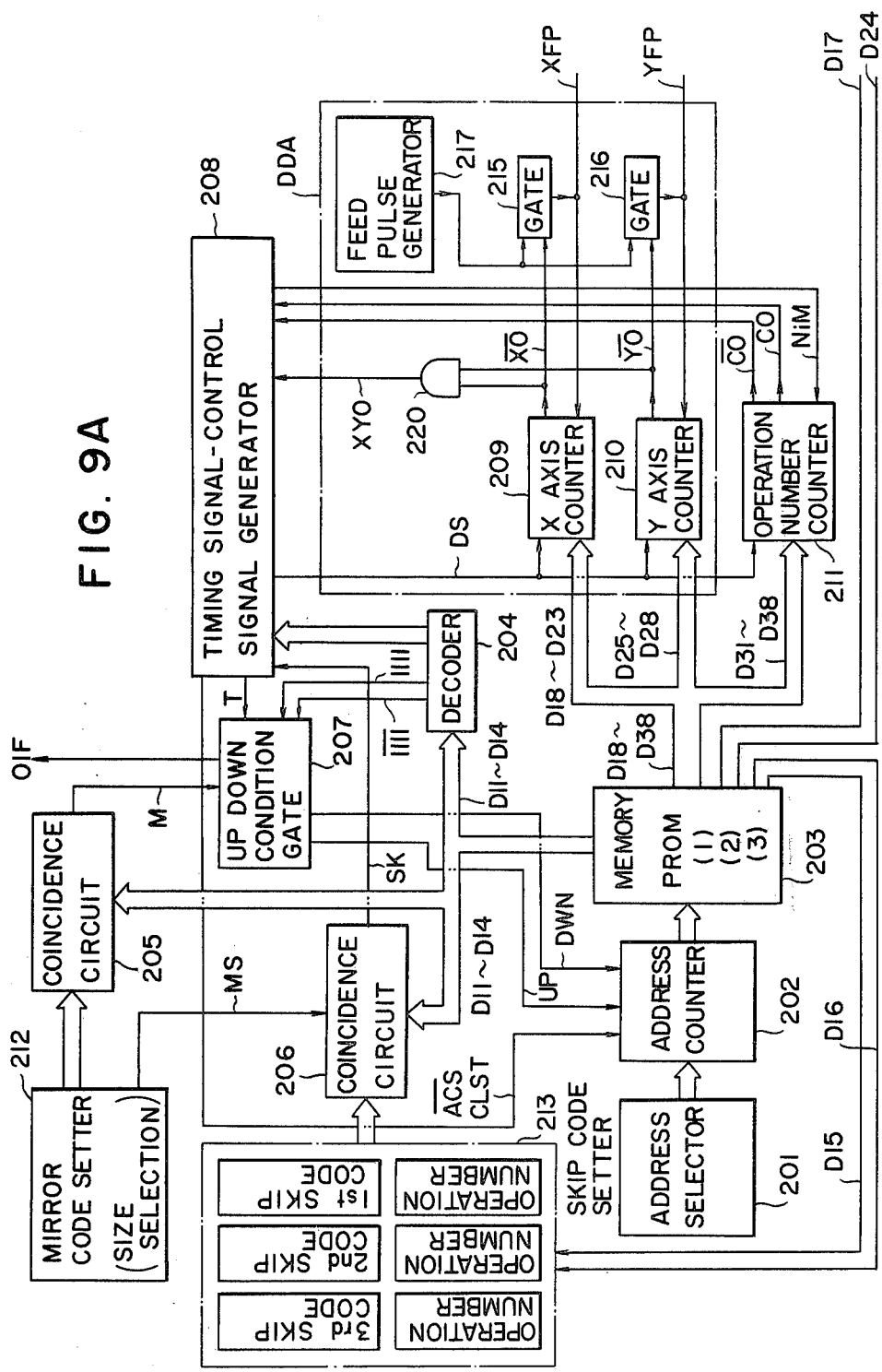
FIGS. 9A and 9B, when combined, show a block diagram useful to explain the process of reading out data from PROM for performing numerically controlled (NC) machining.
Figure 9B:
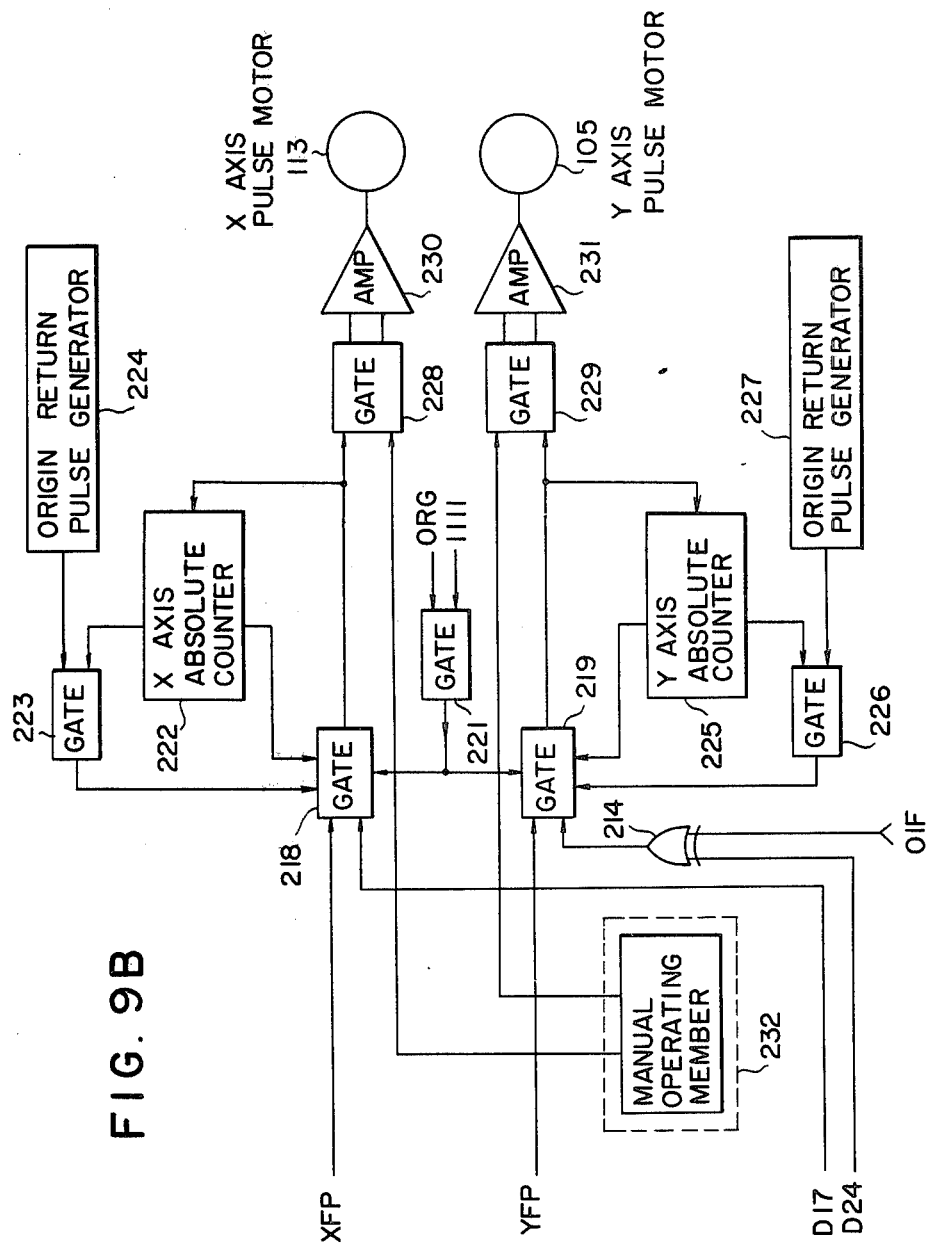

The manner of reading out the contents of PROM shown in FIG. 8 and the manner of processing and applying the contents read out from respective addresses to X and Y axis pulse motors will now be described with reference to a block diagram shown in FIGS. 9A and 9B. This description is helpful to understand the operation of the microcomputer system shown in FIG. 10 and following figures.

There are provided an address selector 201 which designates the address of PROM 203 which stores various data. For example, the sewing data regarding pattern I, the machining data of a cloth clamping plate for this pattern and openings of the clamping plate are stored in addresses o-j, the sewing data regarding pattern II, the machining data of a cloth clamping plate for this pattern and openings of the clamping plate are stored in the addresses $i+1 \sim i+j$. Accordingly, the address selector 201 designates the leading (or next) address of an address group regarding a desired pattern, in the case of an automatic sewing machine. Where the pattern groove and openings are worked on the programmer table the leading addresses of respective data are designated. An address counter 202 is connected to the output of the address selector 201 and its output is used to directly command the 8 bit address code of PROM 203. The address counter 202 is reset by a clear or start signal CLST and then set with the address designated by the address selector 201 in response to an address counter set signal $\overline{ACS}$. Thereafter, the count of the counter is increased or decreased by one by UP or DWN signal. When an address of the PROM 203 is designated, the PROM 203 produces data $D_{11}$-$D_{38}$ (shown in FIG. 8) as readable bits. The read out data $D_{11}$-$D_{14}$ are applied to a decoder 204 and coincidence circuits 205 and 206. The decoder 204 judges that whether data $D_{11}$-$D_{14}$ are stop code 1111, optional stop code 1110 and data code 0000 or not. In the case of the stop code 1111, decoder 204 sends a signal to a up-down condition gate circuit 207 to stop the supply of the address up signal UP or the address down signal DOWN to the address counter 202 from the gate circuit 207. Code signal $\overline{1111}$ is applied to the up-down condition gate circuit through the other line. In the case of the optional stop code 1111, code $\overline{1111}$ becomes effective to also stop the counting operation of the address counter 202. However, in an automatic sewing machine, an independent optional stop switch is provided, and only when this switch is closed, the operation of the address counter is stopped, whereas when the switch is opened, code $\overline{1111}$ is made inactive. In the case of a data code 0000, an instruction is applied to the timing signal-control signal generator 208 for applying a signal DS to counters 209, 210 and 211 to set bit data of $D_{25}$-$D_{28}$, $D_{31}$-$D_{38}$ of PROM 203 in these counters. When data $D_{11}$-$D_{14}$ representing the index of control correspond to any one of mirror codes 0001-1000 set by the mirror code setter 212, coincidence circuit 205 operates to send a mirror coincidence signal M to up/down condition gate circuit 207 so as to change the address signal from UP to DOWN. At the same time, a signal OIF is applied to one input of an OR gate circuit 214 so as to invert the Y axis code bit $D_{24}$ of subsequent data. When data $D_{11}$-$D_{14}$ are equal to one of the skip codes (which are designated as 1001-1101, but in this example 1001, 1010 and 1011 are designated as the first, second and third skip codes) designated by the skip code setter 213, the coincidence circuit 206 applies a skip coincidence signal SK to the timing signalcontrol signal generator 208 to set data $D_{18}$-$D_{23}$, $D_{25}$-$D_{28}$ and $D_{31}$-$D_{38}$ in counters 209, 210 and 211 respectively in the same manner as data code 0000. Since signal MS applied to the coincidence circuit 206 from the mirror code setter 212 constitutes one of the conditions for producing the skip coincidence signal SK, where a mirror code is set by the mirror code setter 212, the skip code becomes effective (that is SK=1) only when the counting condition of the addresses is in the "address down state", that is in a state after the mirror coincidence signal has been generated.

Signal T generated by the timing signal-control signal generator 208 is a clock signal for address counting. Where an address contains a skip code the sewing machine control signals $D_{15}$ and $D_{16}$ produced by PROM are constructed to contain the number of repeating the skip code, whereas when $D_{15}$ and $D_{16}$ are 01, 10, and 11, the operation numbers correspond to 1, 2 and 3. Instead of storing these data in PROM 203, the operation number may be set by a switch mounted on an external panel or a portion of the bits $D_{31}$-$D_{38}$ for the operation number data may be used for this purpose.

The X axis counter 209 and Y axis counter 210 apply signals $\overline{XO}$ and $\overline{YO}$ to gate circuits 215 and 216 respectively, to which are applied pulses XFP and YEP from a feed pulse generator 217. These feed pulses are also applied to the counters 209 and 210 via gate circuits 215 and 216 respectively so as to decrease their counts. The operation number counter 211 applies count out signals CO and $\overline{CO}$ to the timing signal-control signal generator 208 of which the former acting as a condition signal for producing a signal T which advances the address by one. An AND gate circuit 220 is provided for applying a signal XYO=1 to the signal generator 208 when both counters 209 and 210 count out (XO=1, YO=1). At this time, the signal generator 208 applies to the operation number counter 211 a signal NiM which decreases the count of the counter 211 by one. Gate circuits 218 and 219 are applied with the X and Y code bits $D_{17}$ and $D_{24}$ respectively. The feed pulses XFP and YFP are applied to gate circuits 228 and 229, and X and Y axis absolute counters 222 and 225 respectively through gate circuits 218 and 219. The outputs of the gate circuits 228 and 229 are applied to X and Y axis pulse motors 113 and 105 respectively through amplifiers 230 and 231. A gate circuit 221 is provided to stop the application of feed pulses XFP and YFP to the gate circuits 218 and 219 in response to a program origin return instruction ORG or a stop code signal 1111 and applies to these gate circuits origin return pulses AXFP and AYFP generated by the absolute value counters 222 and 215 through gate circuits 223 and 226 respectively. The origin return pulse generators 224 and 227 may be the same one. Furthermore, gate circuits 228 and 229 are connected to receive a feed pulse from a manual operator 232. This feed pulse is also applied to absolute counters 222 and 225, through an appropriate gate circuit not shown. The manual operator 232 is represented by a joy stick 110 shown in FIG. 11.

Figure 10:
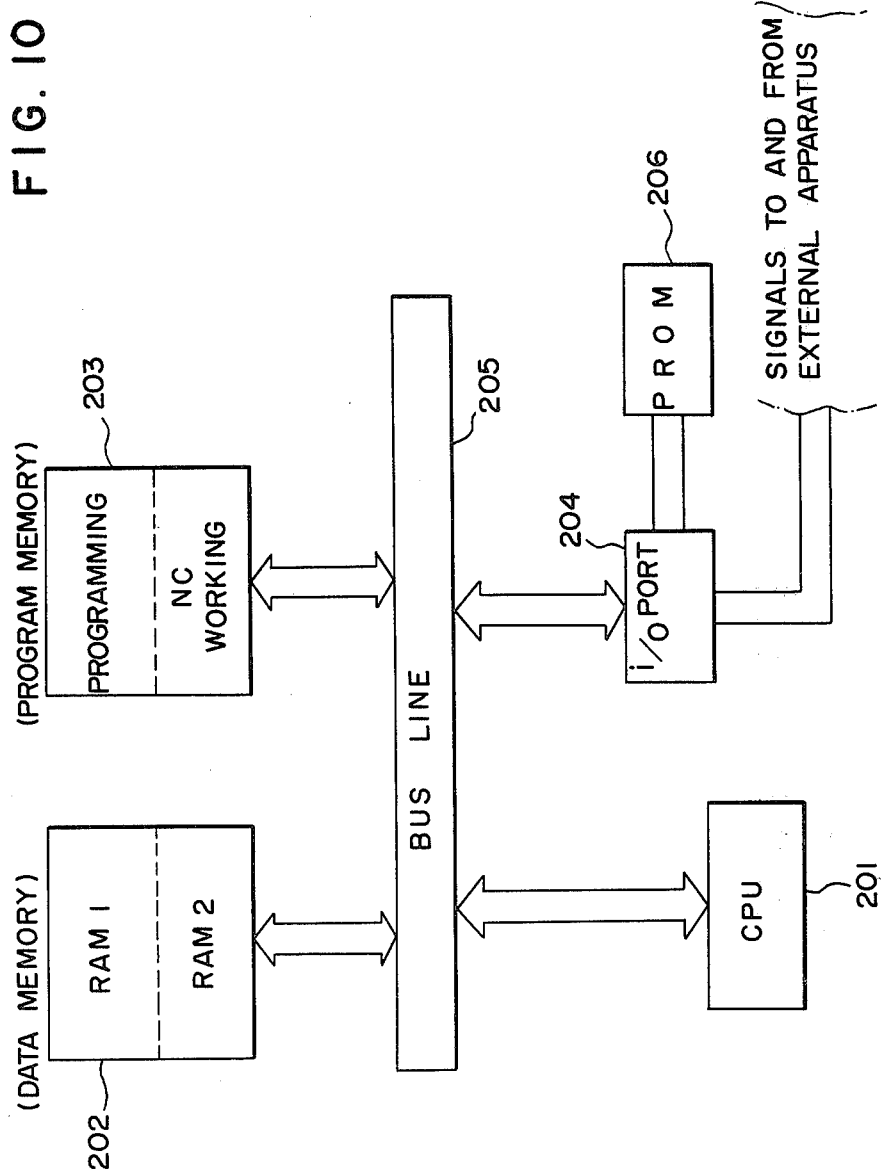
FIG. 10 is a block diagram showing the microcomputer system utilized in the block diagram shown in FIG. 9.

FIG. 10 is a block diagram showing the microcomputer system utilized in the programming apparatus which comprises a central processing unit CPU 201, data memory device 203 for programming and NC working and an i/o port 204 which are all connected to a bus line 205. The i/o port 204 is coupled to a PROM 206 (a ROM writer for writing the PROM is not shown). The i/o port 204 is connected to receive and supply various signals to and from various circuit elements of the programming apparatus or switches, such as signals from the address setter, a start switch, a mirror skip code setter and X, Y pulse motor instruction pulses. RAM1 is provided with a number of bits necessary for data areas for the signals from external apparatus, and the signals for new and old X, Y axis counters, data areas for the address counter, type of control, and X,Y code operation number data, and the data areas for various signals described in connection with FIG. 9. RAM2 is constructed to have the same contents as those programmed into PROM. In other words, RAM2 is provided with a group of address data and an area for the data $D_{11}$–$D_{38}$ corresponding to respective addresses.

A group of instructions for all processing steps necessary for forming data in RAM2 by the programming operation is prestored in a non-volatile memory device (ROM or PROM) in the programming area of the program memory device 203. One example of such group is an instruction group for effecting DDA. In the NC working area are stored instruction group for all processing steps necessary to sequentially read out a group of data which have been programmed into PROM2, or the same data group written into PROM from RAM2 for working a cloth clamping plate (machining of the groove and various openings). The contents of these instruction groups are shown in flow charts to be described later.

Figure 11:
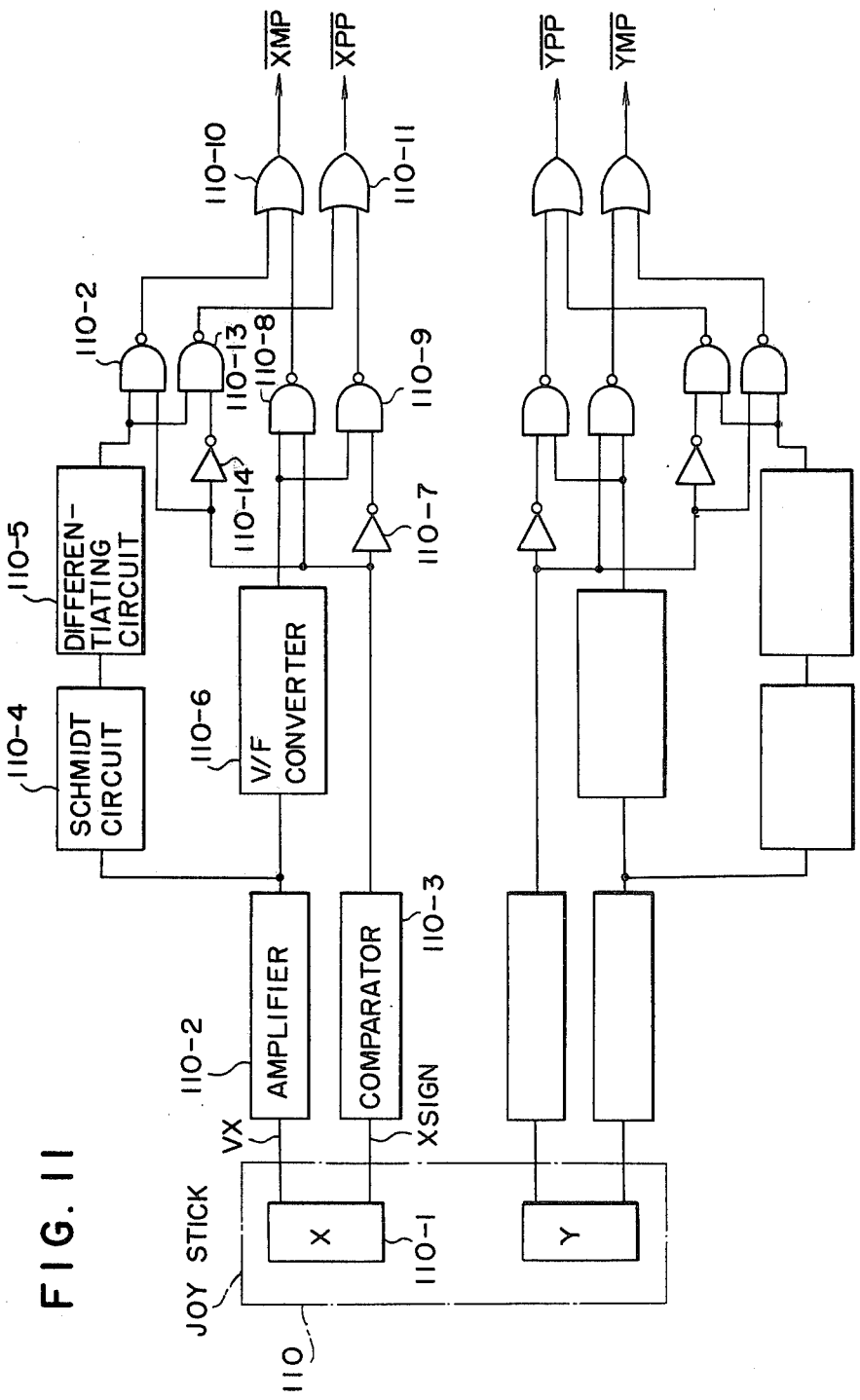
FIG. 11 is a block diagram showing a pulse generator controlled by a joy stick for supplying driving pulses to pulse motors.

FIG. 11 is a block diagram showing a feed pulse generator controlled by joy stick 110 shown in FIG. 1. Since the circuits for X and Y axes have the same construction, only the circuit for X axis will be described in detail. A member 110 produces a voltage output signal VX corresponding to the degree of inclination of the joy stick 110 when it is inclined in the direction of X and an output XSGN representing the polarity of signal VX. 110-2 represents an amplifier, and 110-6 a comparator which produces "0" when XSGN>0 but "1" when XSGN<0. 110-6 represents a voltage/frequency converter which produces an output pulse train only when $|VX|$ is larger than a predetermined set voltage $V_s$. A NAND gate circuit 110-8 is connected to receive the output pulse of the V/F converter 110-6 and the output of the comparator 110-3 so as to apply a negative drive pulse $\overline{XMP}$ to an OR gate circuit 110-10 when $|VX-|>V_s$ and XSGN<0. When $|VX|>V_s$ and XSGN>0, the output of comparator 110-3 is applied to one input of AND gate circuit 110-9 whereby AND gate circuit 110-9 is enabled to apply a positive drive pulse XPP to one input of OR gate circuit 110-11.

A Schmidt trigger circuit 110-4 and a differentiating circuit 110-5 are provided for producing a pulse when $|VX|$ exceeds a trigger level VS' (VS'<$V_s$) under a state of $|VX|<V_s$. AND gate circuits 110-12 and 110-13 and an inverter 110-14 operate in the same manner as AND gate circuits 110-8 and 110-9 and inverter 110-7.

With this circuit construction, each time the joy stick 110 is inclined in a range (to change $|VX|$ from 0 to $V_s'$ but not reach $V_s$), a positive or negative pulse is produced. For this reason, as has been pointed out in connection with FIG. 5, this circuit is suitable for effecting final positioning in the grid region.

Figure 12A:
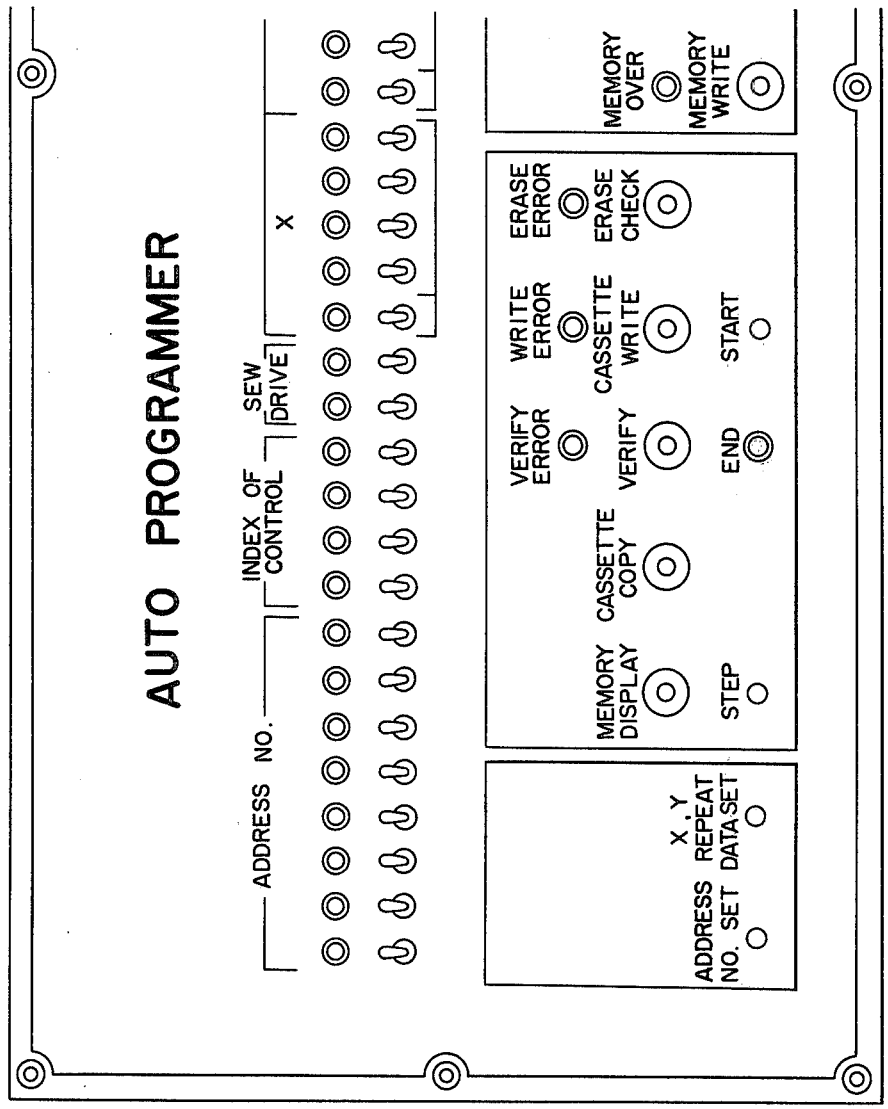
FIGS. 12A and 12B are a front view of a program panel.
Figure 12B:
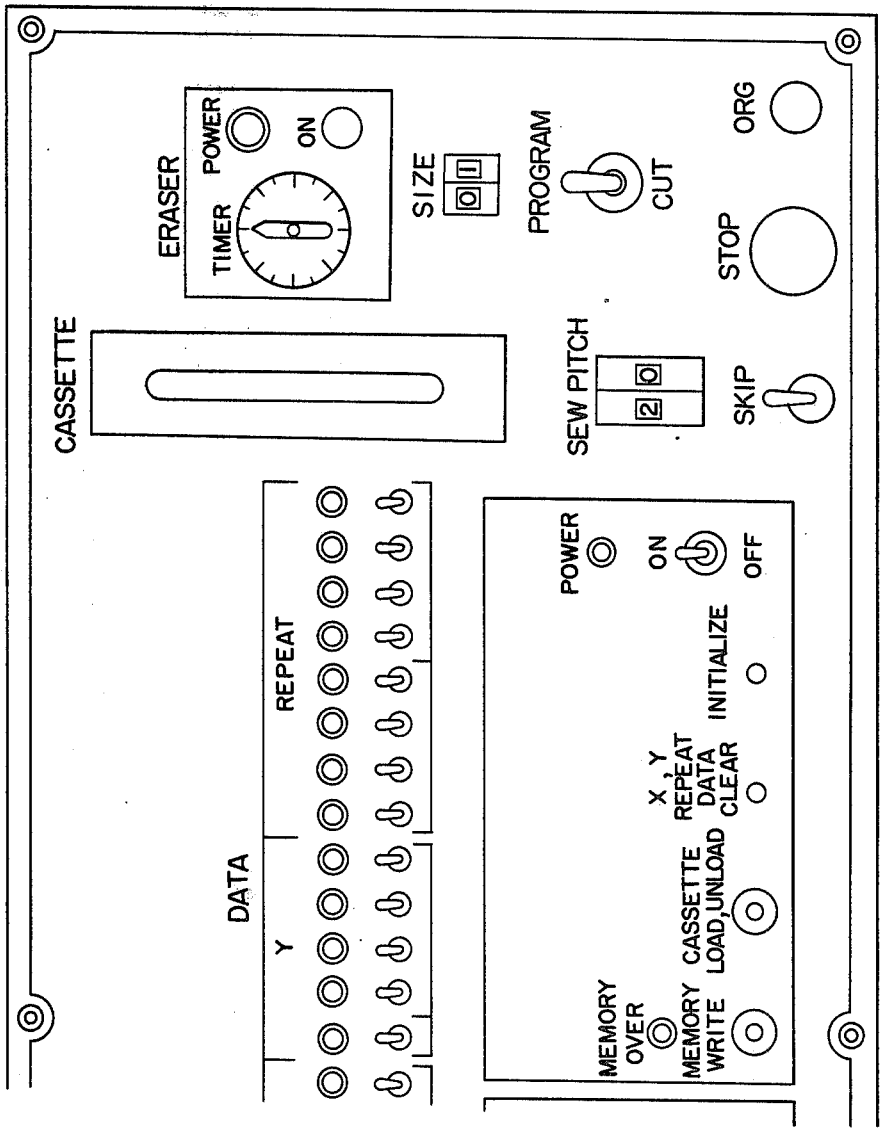

FIGS. 12A and 12B shows a front view of the program panel unit 111 shown in FIG. 1. As shown 8 snap switches which set the addresses of PROM are mounted near the center. To the right of these snap switches are mounted four snap switches corresponding to respective bits $D_{11}$–$D_{14}$ representing the index of control, two snap switches at the bits $D_{15}$ and $D_{16}$ for controlling the sewing machine, and snap switches corresponding to X,Y operation number data. Lamps disposed above the snap switches are used to display bit data stored in the data memory in response to lighting instruction (LAMP OUT) and correspond to respective snap switches.

Push buttons for setting the address numbers are mounted on the left lower corner of the panel. When these buttons are depressed, respective bit states of the 8 bit address setting snap switches are rendered to become conditions which can be stored in memory areas of RAM1 of the data memory device corresponding to the address counter, so that when memory write push buttons are depressed these bit states are stored. In the same manner, the bit states of respective snap switches corresponding to the X, Y data (including their signs) and to the operation number data are rendered to become conditions which can be stored in the corresponding data area of RAM1 so that these data are stored when the data write push buttons are depressed. Where the stylus is positioned to the marks on a sewing pattern on the programmer table as shown in FIG. 5 (usually programming is executed in this manner) all snap switches for X, Y operation number data are turned OFF and the pulse from the joy stick 110 is applied directly to the RAM1. At this time the operation number data are automatically calculated from the numbers of X, Y input pulses. To the left end of the central block is mounted a memory display push button for displaying the bit states of the data area in RAM2 of the data memory device by the lamps on the uppermost row. When a step push button beneath the memory display push button is depressed, the address is advanced by one. A cassette copy push button is depressed when it is desired to transfer the content of already programmed PROM to RAM2 which has been inserted into a cassette shown in the righthand portion of the panel. To the right of the cassette copy push button is mounted a verify push button. When this push button is depressed together with a start button the content of RAM2 and the data $D_{11}$–$D_{38}$ of the addresses of PROM are compared each other under a condition in which the content of RAM2 has been written into PROM or a condition in which the content of PROM has been transferred to RAM2. If coincidence is not obtained an error lamp on the upper row is lighted at that address. When the contents of all addresses coincide with each other, an end lamp is lighted.

To the right of the verify switch there is provided a cassette write push button. When this push button is depressed concurrently with the start button, the content of RAM2 is written in PROM mounted on the cassette. When writing of all addresses is completed, the end lamp is lighted. When writing is not satisfactory an error lamp is lighted to stop addressing. Further, there is provided an erase check push button to the right of the cassette write push button. To erase the content of the PROM, it is inserted in the cassette and irradiated with ultraviolet rays for a definite time (ten to 20 minutes) set by a timer. The PROM erased in this manner can be used again. The erasure check is made for the purpose of confirming whether the PROM has been erased perfectly or not. When erasure is not perfect, the error lamp is lighted. At the left side of the righthand block is provided a memory write push button. When this push button is depressed, the bits of X,Y repeat snap switches are stored in the corresponding data areas of RAM1. A memory over lamp is lighted when the address (for X,Y repeat data) reaches the last one. A cassette load/unload push button is provided for loading and unloading the cassette when the power source is disconnected by this push button. At this time, a lamp mounted on this push button is lighted. An X,Y repeat data clear push button is depressed when it is desired to erase the data which has been stored in RAM2.

An initialize push button is provided to initialize the register of CPU and the bits of all data areas of RAM1 and RAM2. A thumb wheel switch for selecting the size is mounted on the righthand end of the panel. The values of this switch are selected to coincide the mirror code with BCD binary coded data so that they are set to correspond to variations of the size (length of the cuff, dimensions of the collar). Similar thumb wheel switch is provided for setting the stitch pitch. "ZO" means ZO pulses, that is stitch pitch of 2 mm. A skip switch is provided for sequentially rendering effective the skip codes 1001, 1010, 1011, 1100 and 1101 for reading the content of RAM2 or PROM. A switch beneath the thumb wheel switch for selecting the size is thrown to "PROGRAM" for programming operation, and to "CUT" for cutting operation. In addition, an emergency stop push button STOP and an origin return instruction push button ORG are provided.

Figure 13:
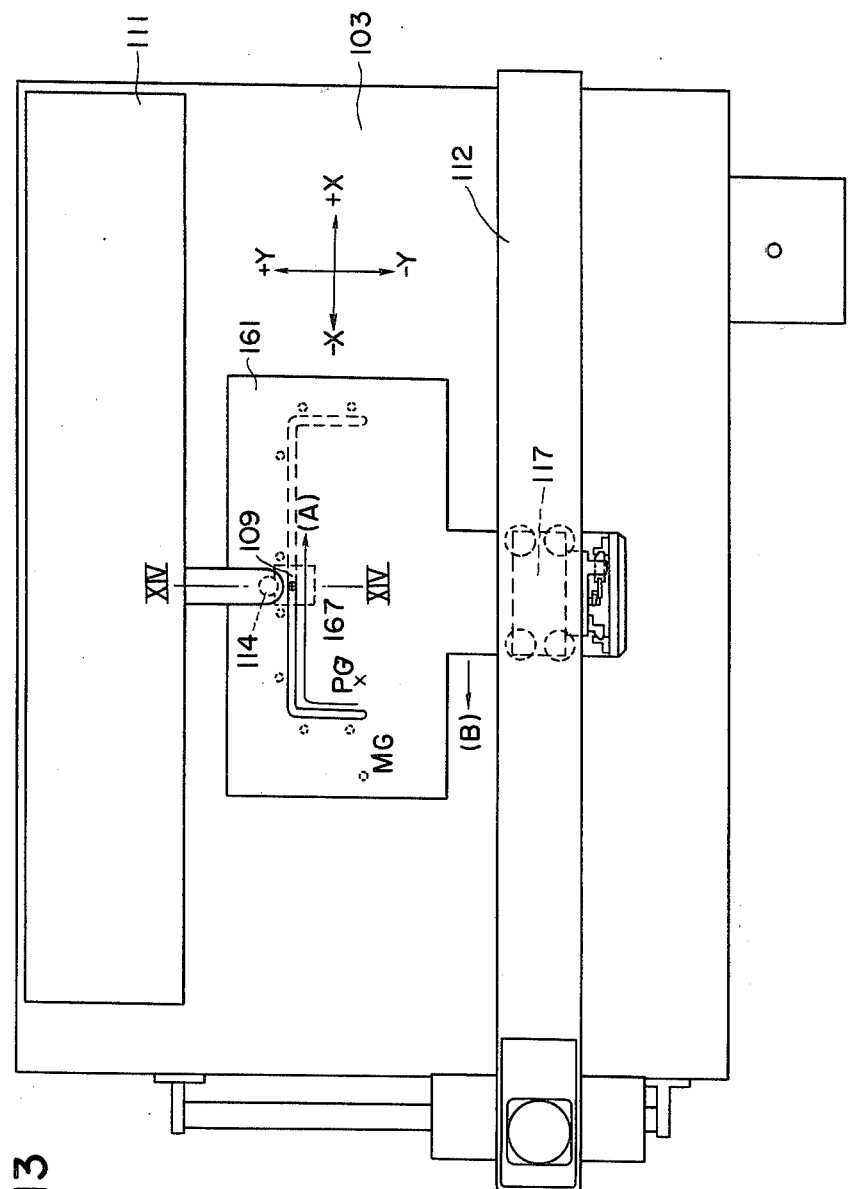
FIG. 13 is a plan view of a cloth clamping plate utilized to sew a cuff and being machined a pattern groove on a programmer table.

FIG. 13 shows a manner of cutting a groove through a cloth clamping plate on the programmer table 103. The cloth clamping plate 161 shown in FIG. 13 is used to sew a cuff shown in FIG. 7A.

Figure 14:
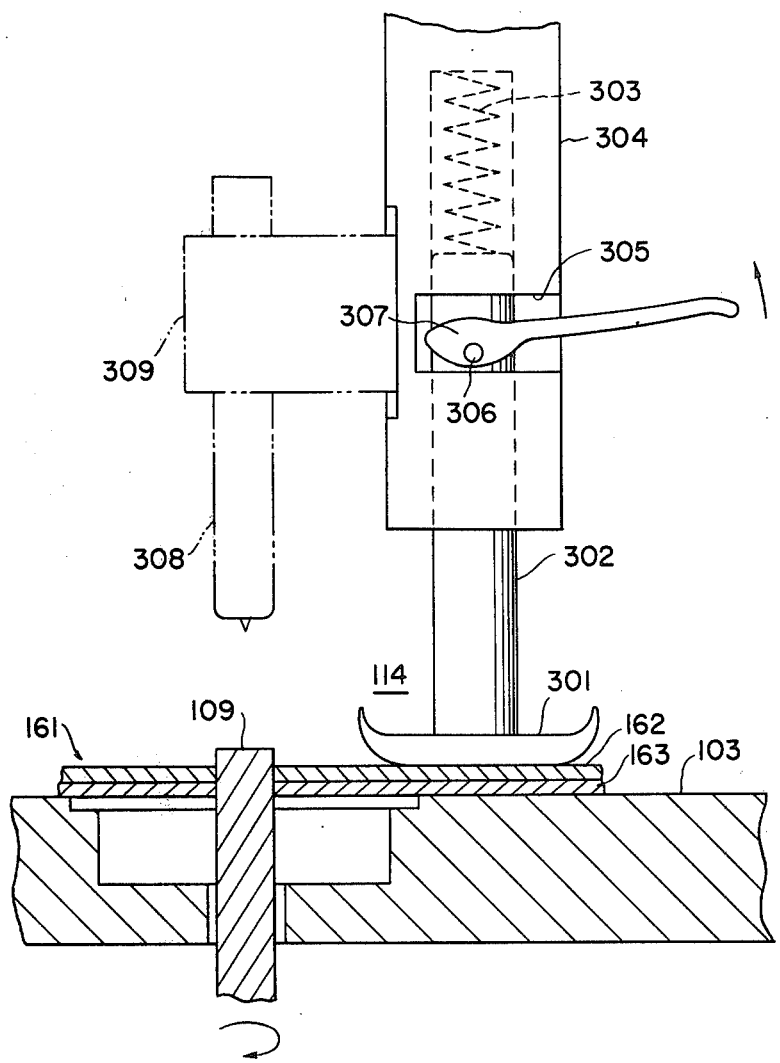
FIG. 14 is an enlarged sectional view taken along a line XIV—XIV in FIG. 13.

Arrow A shows the direction of relative movement between a cutting tool, that is an end mill 109 and the cloth clamping plate 161, while arrow B shows the direction of movement of the cloth clamping plate 161 on the programmer table 103. A press member 114 is provided for the purpose of preventing the portion of the clamping plate 161 under cutting from moving upwardly. As shown in FIG. 14, the upper and lower cloth clamping plates 162 and 163 are moved in unison on the upper surface of the programmer table 103. A shaft 302 having a press member 301 urged against the upper plate 162 is contained in a cylinder 304 to be slidable in the vertical direction. The cylinder 304 is provided with a notch 305 to accommodate a cam 307 secured to shaft 302 by a pin 306. The upper end of the shaft 302 is engaged by a compression spring 303 to be normally applied with a downward pressure. Consequently, when the lever of cam 307 is rotated upwardly, the shaft 302 is raised to release the cloth clamping plate 161. As shown by dot and dash lines, a scribing instrument 308 is mounted just above the end mill 109. The scribing instrument 308 is adjustably mounted on a support 309 secured to the front side of the cylinder 304. Accordingly, it is possible to scribe a sewing pattern curve or the positions of the openings on the cloth clamping plate 161 by using the scribing instrument.

FIGS. 15A and 15B show programmed data of the sewing patterns of the cuffs having 6 different sizes and the data for working the openings which are stored in RAM2 or PROM.

Assuming that a groove and openings are worked according to the data, addresses will be sequentially described. At address O, the index (type) of control $D_{11}$-$D_{14}$ is a stop code 1111 in which case subsequent bits $D_{15}$-$D_{38}$ are all "0" and the cloth clamping plate 161 mounted on the movable body 117 is positioned at the programming origin PG (FIG. 7A) by the stop code 1111. Accordingly, the axis of the end mill 109 coincides with the origin PG. When the end mill 109 is lowered below the upper surface of the programmer table 103 and when the address set switch on the panel unit 111 is set to address 1 (00000001), address 1 of the address counter, that is PROM or RAM2 is designated. At address 1, since bits $D_{11}$-$D_{14}$ are data codes 0000, the data of $D_{17}$-$D_{38}$ are read out so that 6 pulse movement in the direction of +X is repeated 5 times, with the result that the end mill 109 is brought to point $d_1$ shown in FIG. 7A. Since the next address 2 contains an optional stop code 1110, the movement of the cloth clamping plate 161 is stopped. At this time, a cylinder is operated to raise end mill 109 so as to form an opening from the bottom side of the cloth clamping plate 161 at point $d_1$. Then the foot switch is depressed and the address is advanced to 3 where X, Y data is "0", the operation number data is 1 and $D_{16}$="1". This means that, on the automatic sewing machine, a single stitch is made at point $d_1$ at low stitch speed. At address 4 the bit is a data code 0000 so that a 9 pulse movement in the direction of −Y is instructed once. In the same manner at address 5, 8 pulse movement in the direction of +Y is instructed once. At address 6, 8 pulse movement in the direction of −Y is instructed 31 times.

In this manner, the cloth clamping plate 161 is moved in the direction of −Y from point $d_1$ to point $d_2$ with respect to end mill 109. In the following, it is described that the end mill 109 is moved relatively (During cutting, at bits $D_{15}$ and $D_{16}$, any other bit values than the skip code are not read out). Between addresses 7 and 13, the portions of the groove between points $d_2$ and $d_3$ are cut.

At addresses 14 and 15, the end mill is moved according to the movement data between points $d_3$ and $d_4$. The address 16 corresponds to the first mirror code (0001). Addresses 17 and 18 concerns the movement data from point $d_4$ to point $d_{4\text{-}1}$ (FIG. 6). When the data code 0000 at these addresses are read out the end mill 109 is moved relatively to point $d_{4\text{-}1}$. In the same manner, address 19 concerns the second mirror code 0010, while addresses 20 and 21 concern the movement data of from poind $d_{4\text{-}1}$ to point $d_{4\text{-}2}$. In the same manner, address 22 concerns the third mirror code 0011, addresses 23 and 24 the movement data between points $d_{4\text{-}2}$ and $d_{4\text{-}3}$, address 25 the fourth mirror code 0100, addresses 26 and 27 the movement data between points $d_{4\text{-}3}$ and $d_{4\text{-}4}$, address 28 the fifth mirror code, addresses 29 and 30 the movement data between points $d_{4\text{-}4}$ and $d_{4\text{-}5}$, and address 31 the sixth mirror code. Assume now that the thumb wheel switch on the panel unit 111 for setting the mirror code produces a code "01" only, the first mirror code 0001 is made effective so that the cutting by the end mill 109 is advanced from point $d_3$ to point $d_4$. Then when address 16 is read, since the index of control $D_{11}$-$D_{14}$=0001 at that address, a mirror coincidence signal M is produced. Accordingly, the order of advancing the address is reversed from address 16 to address 15 and the addresses are sequentially designated in an address down mode. Consequently, at addresses 15 and 14, the cutting is advanced from point $d_4$ to point d' (there is no intermediate points $d_{4\text{-}1}$−$d_{4\text{-}5}$), points $d_4$ and $d_3'$ being spaced by the same distance as points $d_3$ and $d_4$. Between addresses 13→7, data of point $d_3'$ to point $d_2'$ are read out. But since the mirror coincidence signal M has been produced, the coordinates of Y are reversed. In the same manner, the movement from point $d_2'$ to point $d_1'$ is advanced in the order of addresses 6→5→4→3 and the movement is stopped by the optional stop at address 2. At this time, the end mill 109 is at point $d_1'$. Then after withdrawing the end mill 109 from the upper surface of the programmer table, the foot switch is depressed to advance the address. At address 1 the end mill is moved from point $d_1'$ to point PG' in the direction +X by 50 pulses. Then the address is advanced to 0 where an origin return instruction is provided by stop code 1111 to move the end mill to the program origin PG, at which counts of X and Y absolute counters become zero. Thus, the axis of the end mill 109 is returned to the program origin, thus finishing the cutting of groove 167 (FIG. 7A). In the groove working described above it was assumed that the size of the cuff (at the central portion) is minimum, but by setting the thumb wheel switch to 02, 03, 04, 05 and 06 respectively it is possible to cut grooves 167 suitable for these sizes.

Let us now describe working of the openings.

In this case, the address set switch is set to address 33 (00100001). Since the address counter has been cleared by the start signal, it designates address 0, at which a stop code is read out so as to position the end mill at the program origin PG. When the start signal is applied, the address counter is supplied with address set value to designates address 33. The address 33 contains a data code 0000 so that the end mill is moved from the program origin PG to the working origin MG in the direction of +X by repeating 15 times 15 pulses (total 225 pulses). By this movement, the end mill 109 is positioned just beneath the working origin MG. Then, at address 34, an optional stop code is read out so as to stop the movement. Then the end mill 109 is raised by cylinder 107 to work an opening at the working origin. After lowering the end mill the foot switch is depressed again to advance the address to 35, thereby moving the end mill to point $R_1$. As above described, an opening is formed at point $R_1$. In the same manner, the address is advanced to 44 at which an opening is formed. At address 45, a point R is reached and at address 46 the first mirror code 0001 is read out. At this point, the address up mode is changed to the address down mode thus designating address 45. By the output of this address, the end mill is moved to point $R_4'$ to form an opening.

In the same manner, openings are formed at points $R_3' \rightarrow R_2' \rightarrow R_1'$. Forming the opening at point $R_1'$ is executed by address 37 (optional stop code). Then the address is advanced to 1 thus designating address 36. By the outputs of addresses 36 and 35, the end mill 109 is moved to point MG' (not shown) which is symmetrical to the origin MG with reference to the center line 1. At the address 34 an optional stop code is produced. Since at point MG' no opening is formed, the foot switch is depressed again to advance the address to 33. By the data stored in this address, the end mill is moved from point MG' to point PG'. Thereafter, the address is advanced to address 32 at which an origin returning instruction is produced by stop code 1111 thus returning the end mill 109 to the program origin PG.

Figure 16:
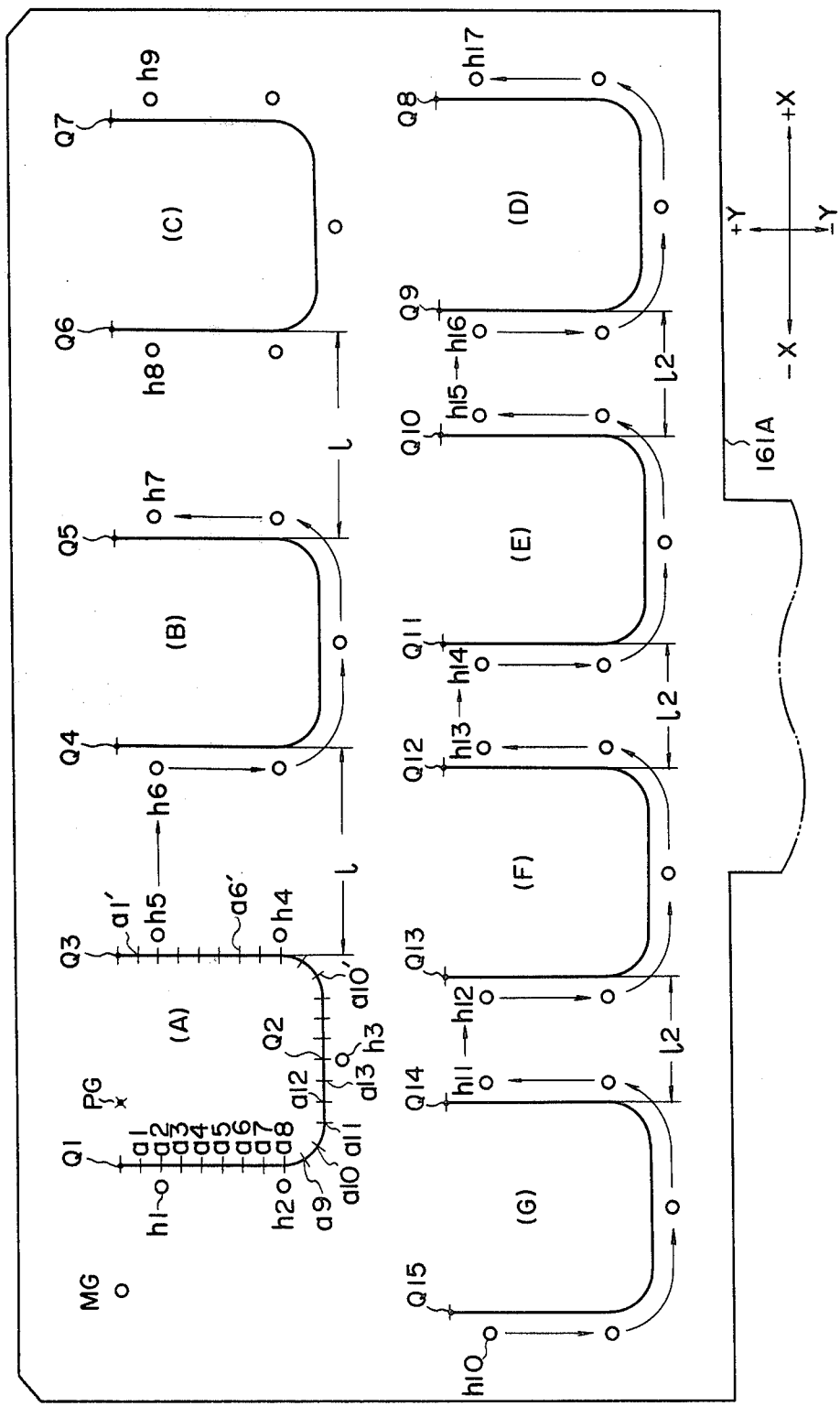
FIG. 16 is a plan view showing a cloth clamping plate provided with a number of pocket patterns.

FIG. 16 is a plan view of a cloth clamping plate 161A on which are depicted seven pocket patterns A through G by using the skip code and the mirror code; and FIG. 17 shows the content of a program for sewing the pocket patterns shown in FIG. 16. As shown in FIG. 17, the data of the pocket patterns are stored in two groups of addresses of PROM, namely addresses 51–64 (for cutting grooves or sewing) and addresses 65–81 (for working openings). The process of working grooves of the pocket patterns and openings by sequentially reading out the data shown in FIG. 17 from PROM will now be described.

At first the address set switch of the panel unit 111 is set to 52, that is 0110100, skip switch is thrown to the upper side and the mirror code thumb switch is set to 001. Further, the program/cutting transfer switch is thrown to CUT side, and a blank of the cloth clamping plate 161A is mounted by a chunk on the movable body 111 in the Y table 112.

When the initialize push button is depressed the address counter is cleared thus designating address O. As shown in FIG. 15A, since address O contains a stop code 1111, the movable body 117 is moved so as coincide the program origin PQ, hence the center of the end mill 109 with point PG. Upon depression of the foot switch, address is advanced one by the address up mode. Thus, when address 52 is designated, the end mill 109 is moved relatively from point PQ to sewing start point Q1. Then the address is advanced to address 53 to raise the end mill 109 by stop code 1110 contained in address 53 for forming an opening at point Q1. At the same time, the end mill 109 is projected above the programmer table 103. When the foot switch is depressed again the address is advanced to 54. The addresses 54, 55 and 56 contains first, second and third skip codes, but at first only the first skip code is effective. Since a mirror code 0001 has been set by the thumb wheel switch, in the case of the address up mode, the first skip code 1001 is set in RAM1 so that no skip coincidence signal is produced even when the bits $D_{11}$–$D_{14}$ of the address 54 are 1001 which is identical to the skip code. Consequently, the address is advanced to address 55. Since this address contains the second skip code which is not rendered effective, the address is advanced further by one to reach address 56 (third skip code). In the same manner, the address is advanced by one to reach address 57 (optional stop code 1110). Upon depression of the foot switch at address 57, the address is advanced to 58, at which the amount of movement in X and Y directions is zero. (the operation number 1 has a special meaning at the time of sewing.) When the address is advanced further to 55, 12 pulse movement in the direction of +Y is repeated 8 times. Consequently the end mill is moved from point Q1 to A8 thus cutting a pattern groove. In the same manner, the address is advanced along points A9→A10→A11 corresponding to addresses 60, 61 and 62 to move the end mill 109 to point Q2 thus forming the groove. The address at this time is 63. At the next address 64, as the bits $D_{11}$–$D_{14}$ relate to a mirror code 0001, the mode is changed to address down mode thus reversing address to 63. Thus, the portions of the groove between points Q2 and Q3 are cut according to the data contained in addresses 65 to 58.

At this time, the sign bit 0 of Y axis is reversed. Then the end mill 109 is lowered by the optional stop code 1110 in address 57. At addresses 56 and 55, only the first skip code 1001 is effective, so that the address is advanced sequentially to address 54. The bits $D_{11}$–$D_{14}$ at this address coincide with the first skip code 1001 and since at this time the address is advanced in the address down mode, a skip coincidence signal is produced to read the data in bits $D_{15}$–$D_{38}$. As the bits $D_{15}$ and $D_{16}$ determines the number of repetition of the first skip code 10, that is two repetitions are instructed at this time. Thus, the end mill is moved from point Q3 to point Q4 (groove is not cut). Accordingly, the repetition number data 2 of the first skip code is changed to one. Then at address 53, the end mill 109 is raised to form an opening at point Q4.

Address set switch is initially set to 52 which is stored in an area of RAM1, and until all repetition numbers of respective skip codes (the bits $D_{15}$ and $D_{16}$ of addresses 54, 55 and 56 are 10, 01 and 11 respectively so that the total number of repetitions is 6) have been executed this set value is stored in RAM1. When the skip codes are repeated a predetermined number of times, one is added to the address set value 52 being stored in RAM1 thus changing the address to 53.

In this manner, after forming an opening at point Q according to the optional stop code contained in address 53, the address counter of RAM1 is cleared by a signal from the start push button and a new address set switch data 53 (52+1) of RAM1 is set in the address counter in response to an address counter set signal $\overline{ACS}$. More particularly, where skip and mirror codes have been set, and when the foot switch is depressed in response to a new address set value, said start push button signal would be produced. As a consequence, the address advancing mode is changed to the address up mode. Thus, as the foot switch is depressed again, the address is advanced to 54. However, under the address up mode, no skip coincidence signal is produced. As the address is advanced to address 57 through 55 and 56, a groove of the second pocket pattern B is cut. At address 64, the mode of advancing the address is reversed by a mirror coincidence signal whereby groove is cut up to point Q5 according to the contents of addresses 63→62→61→60→59→58. At address 57, the end mill 109 is lowered by the optional stop code and then the foot switch is depressed. Since addresses 56 and 55 do not produce any skip coincidence signal the address is advanced toward lower order thus reaching address 54. At this address, since the first skip code 1001 of RAM1 coincide with the code 1001 of bits $D_{11}-D_{14}$, a skip coincidence signal SK is produced and the data of subsequent bits $D_{17}-D_{38}$ are read out to move the end mill from point Q5 to Q6. Upon completion of this movement, the number of repetitions of the first skip code in RAM1 is reduced to zero. Next time the second skip code (the number of repetitions is 1) is rendered effective. When the advance of the address is completed the address is advanced in the down mode to address 53 containing an optional stop code. At this point, the end mill 109 is raised to form an opening at point Q6.

Then, when a start push button signal is produced by the foot switch, the mode of advancing the address is changed to up mode and after passing through addresses 54, 55 and 56, the groove of the pocket pattern C is cut according to the data in addresses 58→59→60→61→62→63→64→62→61→60→59→58. At this time, the end mill 109 is positioned at point Q7. After lowering the end mill 109 at address 57, the foot switch is depressed. Then the address is advanced to 56 where no skip coincidence signal is produced but it is produced at the next address 55. Consequently, the lowered end mill 109 is moved from point 7 to point Q8. Thus the cloth clamping plate 161A is moved one pulse in the direction of −X and 15 pulses in the direction of +Y. This pattern of movement is repeated 30 times so as to bring the end mill to a point just beneath point Q8. The number of repetitions of the second skip is determined to be one by the bits $D_{15}, D_{16}=$"01" of the address 55 so that as this movement is completed, the second skip code is rendered ineffective. Thereafter, the third skip code in address 56 is made effective. In the same manner, grooves having pocket patterns D-G are sequentially cut. When the last or third skip code (number of repetition is 1) is executed, that is when the end mill has been moved from point Q13 to Q14, and when a groove having a pocket pattern D has been cut, the address is moved from 58 to 57 according to the down mode at which the end mill is lowered and the origin return push button ORG is depressed to move the end mill to a position immediately below the program origin PG. At this time, the counts of both X and Y axis absolute counters become zero. Such origin returning operation can also be accomplished by advancing the address according to a down mode 56→54→53→52→51 and by producing a stop code at address 51. This means that a stop routine is executed. Then the working origin MG and pin openings $h_1, h_2 \ldots h_{11}$ about respective pocket patterns shown in FIG. 16 for receiving cloth positioning pins are formed. In the address region 65-82, mirror code is not used. To form these openings the address selection switch is set to address 65. When a start push button signal is applied, the address counter is cleared or reset and then set with 65 by the address counter set signal $\overline{ACS}$.

The bits $D_{11}-D_{14}$ of address 65 are data code 0000, and bits $D_{17}-D_{38}$ produce an instruction for repeating 15 times the 15 pulse movement in the direction of +X. Accordingly, the end mill 109 is moved from a position immediately beneath the program origin PG to a point immediately beneath the working origin MG. Address 66 contains an optional stop code 1110 so that the end mill is raised to form an opening at the origin MG. After lowering the end mill, the foot switch is depressed to advance the address to 67 whereby the end mill is moved from MG to point $h_1$. When the end mill is positioned immediately beneath point $h_1$, the next address 68 is reached whereby an opening is formed at point $h_1$ by raising and lowering the end mill.

In the same manner, the address is advanced to 75 and then to 76 at which an opening is formed at point $h_5$. Bits $D_{11}-D_{14}$ of address 77 contain the same code as the first skip code and now only the first skip code is made effective, so that a skip coincidence signal SK is produced. The bits $D_{15}$ and $D_{16}$ of address 77 are "10" meaning that the number of repetitions is 2.

Then the end mill 109 is moved to a point immediately beneath point $h_6$ by reading and executing the data of bits $D_{17}-D_{38}$. The next addresses 78, 79 and 80 are not effective because of the second and third skip codes whereby the address is advanced sequentially to 81. Since address 81 contains an optional stop code 1110 the end mill 109 is raised and then lowered to form an opening at point $h_6$. Then, the foot switch is depressed to advance the address to 82 for producing a stop code 1111. Under these conditions, since the first skip code has been executed only once (which is smaller than the sum 6 of the repetition numbers 2,1 and 3 of the first, second and third skip codes) the end mill would not be returned to the origin by the stop code 1111. Accordingly, the address counter is reset and then set with 68 designated by the address set switch (at first the counter is set to 65 but added with 3 when an opening is formed). Then, when the foot switch is depressed again at address 68, the address is advanced to 76 through 60-75 thus forming an opening at point $h_7$. At address 77, the first skip code 1001 becomes effective so as to move the end mill from point $h_7$ to point $h_8$. When the address is advanced to address 82 (stop code) in the same manner as above described, the second skip code 1010 (the number of repetition is one) is made to be effective. Consequently, after designating address 68, by the step up to address 67 openings are formed up to point $h_9$. In the same manner, when the skip from point $h_9$ to point $h_{17}$ is executed by the second skip code data $D_{17}-D_{38}$ at the addresses $D_{17}-D_{38}$, the end mill 109 would be brought to a point immediately beneath point $h_{10}$ thus forming openings up to point $h_{11}$ by the steps of addresses 68 through 76. Then, the third skip code is made effective (the number of repetitions is 3) and the openings are formed at points $h_{11}$ and $h_{12}$. In the same manner, similar patterns of movement and opening working are executed between points $h_{12}$ and $h_{13}$, between points $h_{13}$ and $h_{14}$, between points $h_{14}$ and $h_{15}$, between points $h_{15}$ and $h_{16}$ (until this point the third skip code is repeated three times). Thereafter, similar operation is executed between points $h_{16}$ and $h_{17}$ by addresses 68–76.

Since all skip codes at the following addresses 77, 78, 79 and 80 are not effective, when the foot switch is depressed at address 81, the routine is transferred to the stop routine by the stop code 1111 at the next address 82 whereby an origin return instruction is given to move the end mill 109 to a position immediately beneath the program origin PG. At the same time, the counts of the X and Y axis absolute counters of RAM1 become zero. Thus, the cutting of the pocket pattern grooves and working of the working origin MG and openings for the cloth positioning pins have completed.

As shown in FIGS. 15A, 15B, 17A and 17B, the skip code group is stored in the beginning portion of the addresses where there is a mirror code whereas in the end portion there is no mirror code. +3 or +1 is added to the value set by the address set switch and stored in RAM1 depending upon whether openings (including point MG) or grooves are to be worked. The data for working the working origin MG and points $h_1$–$h_7$ may be stored in separate address areas instead of in addresses 51–82 as shown in FIGS. 17A and 17B. For example, it is not necessary to add +3 to the data in RAM1 when an address is substituted for address 65 and when the next address 85 is stored with a stop code.

In the foregoing, with reference to FIGS. 15A, 15B, FIGS. 17A and 17B, a process of forming grooves and openings through cloth clamping plate in accordance with the contents programmed in PROM or RAM2 has been described.

Figure 18:
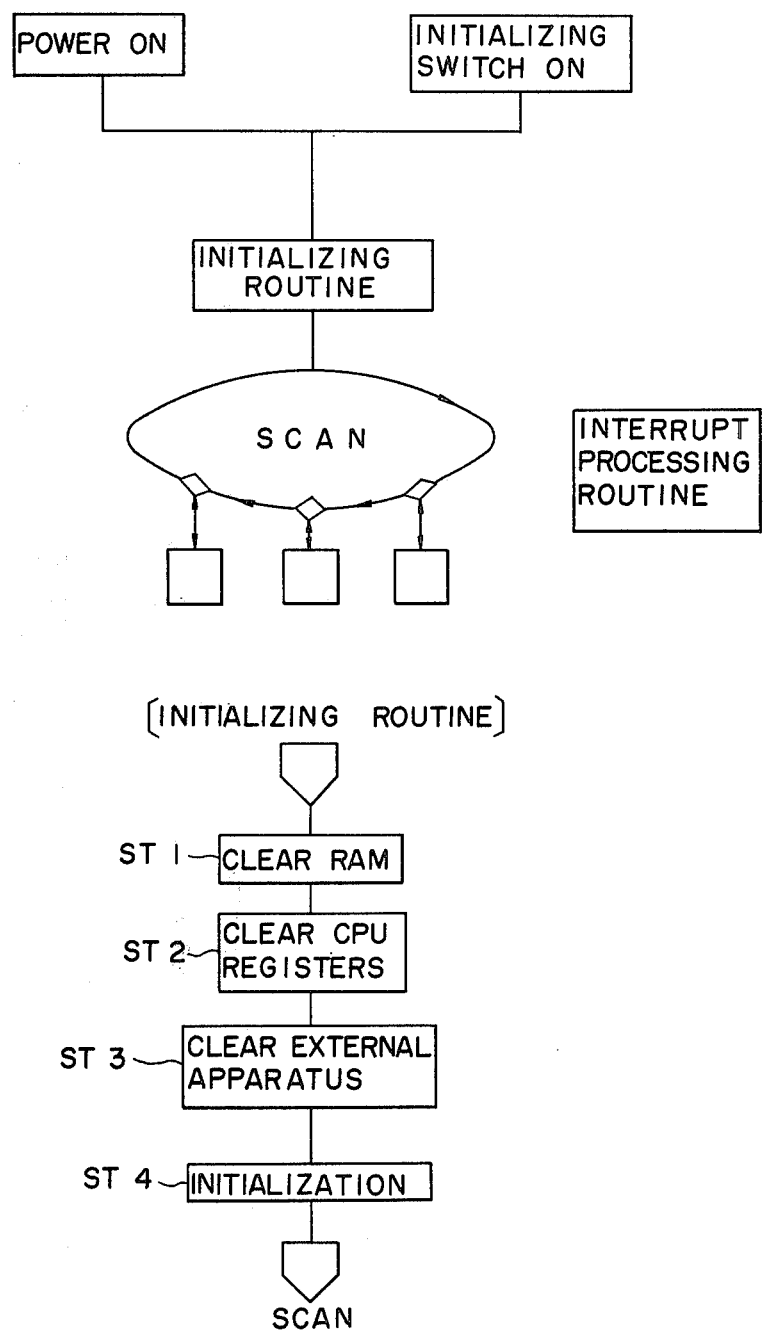
FIG. 18 is a flow chart showing the initializing routine of the programming apparatus using a microcomputer system.

FIGS. 18, 19A–19E are flow charts showing the detail of the process steps of programming the program memory (FIG. 10) of the micro-computer system which forms the program data. FIGS. 20, 21A, 21B, 22A, 22B, 23A, 23B, 24A and 24B are flow charts of th program memory shown in FIG. 10 utilized for performing NC machining. Turning first to FIG. 18, the power switch and initialize switch of the panel unit 111 are turned ON so as to execute the initialize routine. At the first step ST1 of this routine all data areas of RAM1 and RAM2 are cleared. Then, at step ST2, registers of the CPU are also cleared, and at step ST3 external apparatus are cleared. At step ST4 necessary initialization is performed. When the initialize routine is over the routine is transferred to the scanning routine. When an interruption occurs an interruption processing routine is executed and when this routine has been executed the routine is returned to the scanning routine.

Figure 19A:
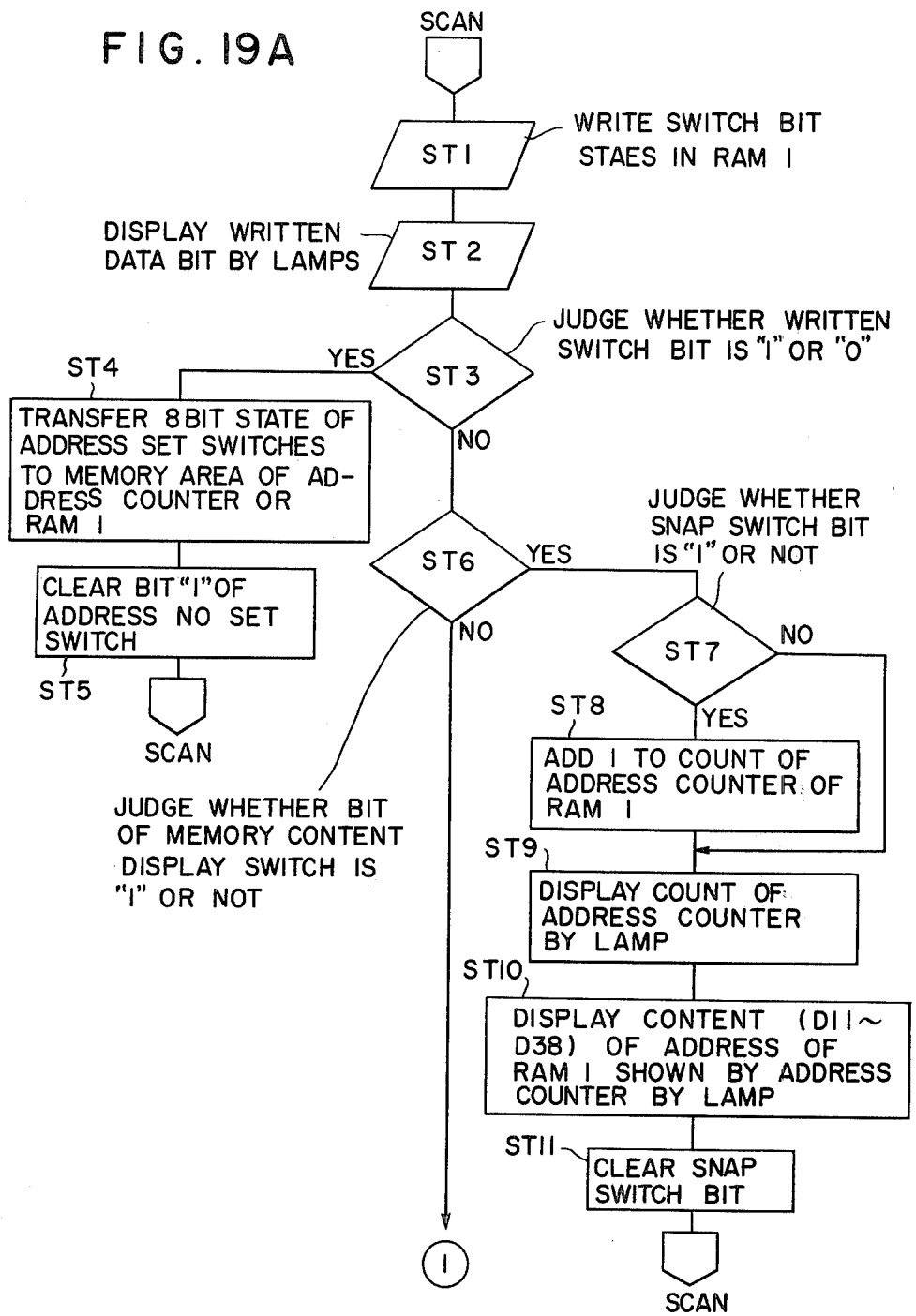
Figure 19B:
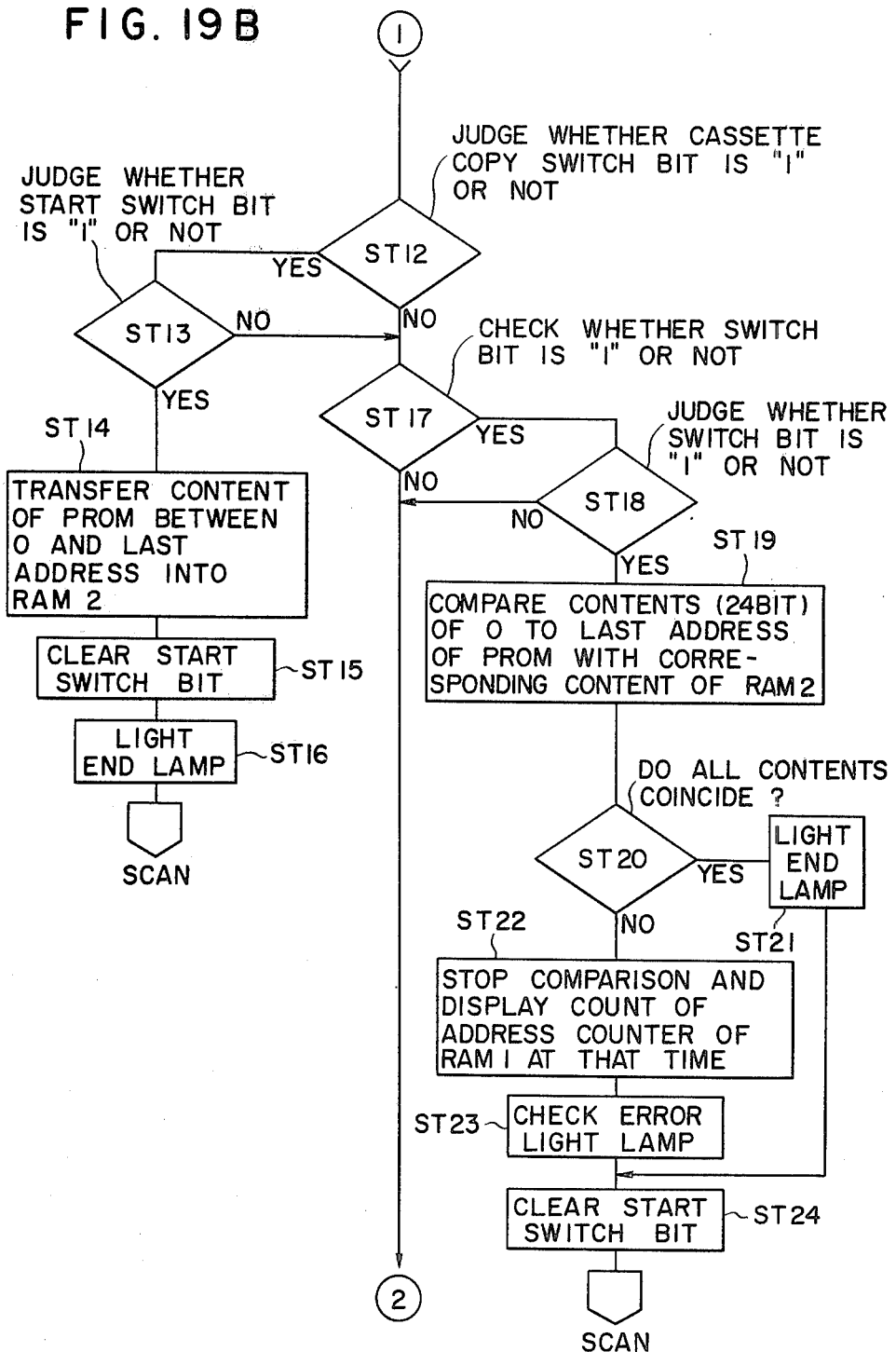

FIG. 19A is a flow chart showing the detail of the scanning routine. At step ST1, the bit states of all switches are written into corresponding memory areas of RAM1. At step ST3 the written data bits are displayed by corresponding lamps on the program panel 111. At step ST3, a judgement is made as to whether the bit written in the RAM1 for setting the address number is "1" (ON) or "0" (OFF). If the result is YES, the step is advanced to step ST4 for transferring the 8 bit state of the address set switches already written in RAM1 to the memory area of the address counter of RAM1. Then at step ST5, bit "1" of the address number set switch written into RAM1 is cleared to return to the scanning routine. When the result of step 3 is NO, a judgement is made at step ST6 as to whether the bit of the memory content display switch is "1" or not. When the result of ST6 is YES (that is switch is ON) steps ST7–ST11 are executed to sequentially display the content of the address counter of RAM1. At step ST11 the snap switch is cleared to return the routine to the scanning routine. When the result of step ST6 is NO, a judgement is made at step ST12 as to whether the bit of the cassette copy switch is "1" or not. When the result of this step is YES, at step ST13 a judgement is made as to whether the start switch bit is "1" or not. When the result is YES the step is advanced to step ST14 to transfer the contents of ROM between the 0 address and the last address into the corresponding addresses of RAM2. Steps ST13, ST14, ST15 and ST16 show the steps of transferring the programmed content of PROM into RAM2. At steps ST17–ST24, coincidence between the contents of PROM and RAM2 is checked at each address. When the result of step 17 is NO, the data is written in already erased PROM at step 25. Such cassette writing is made by storing the data regarding the working of the sewing pattern and the openings which have been stored in RAM 2 by the program step group (FIG. 19B) to be described later, and after checking that whether the contents are correct (such checking can be made by reading out the data in RAM2 and by depicting the sewing pattern and positions at which openings are formed by using the scribing instrument 308 (FIG. 14)), steps ST28, ST30 and ST31 are executed at each address. The step of increasing the address by one is not provided for steps ST26–ST32.

Figure 19C:
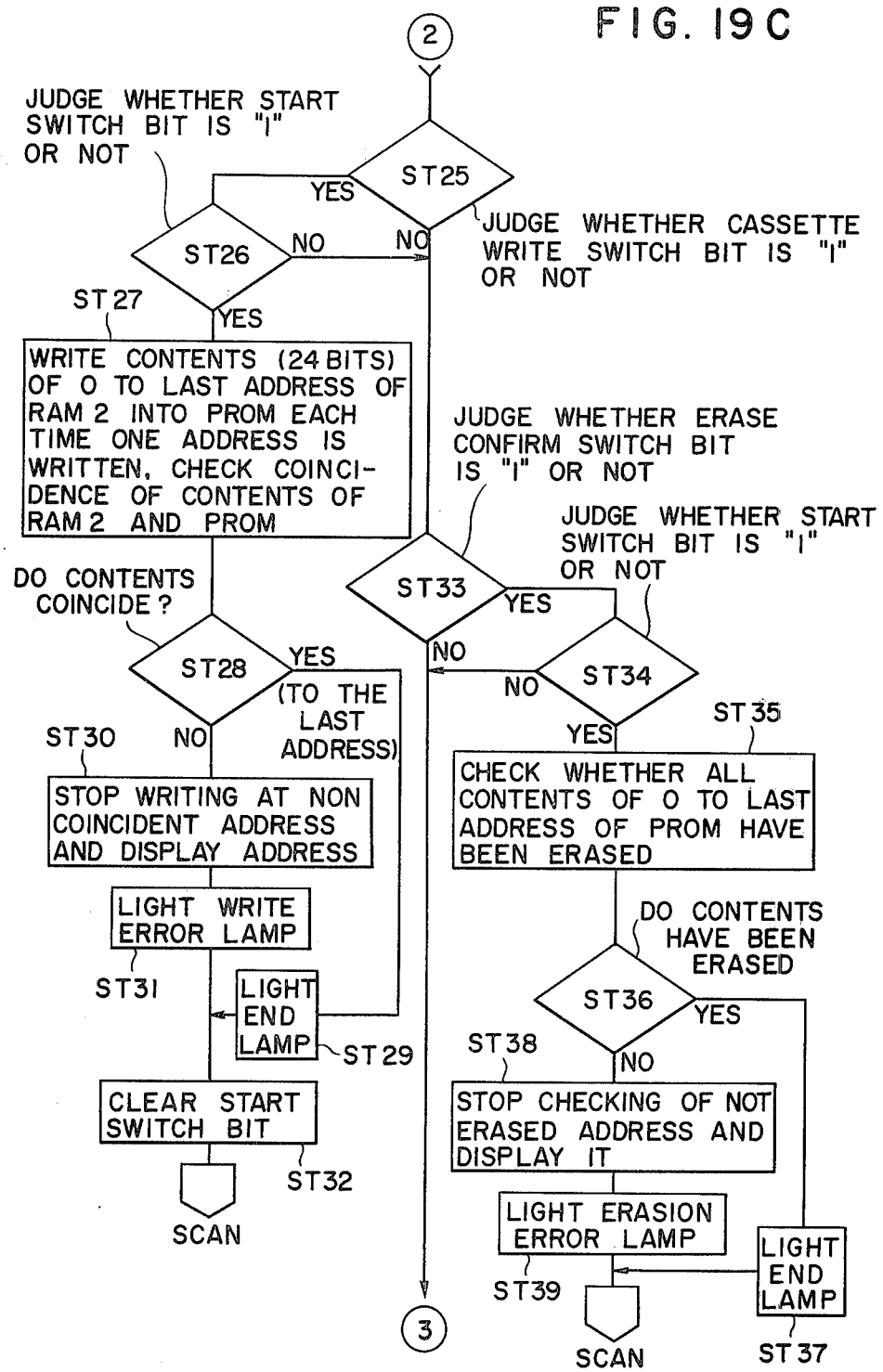
Figure 19D:
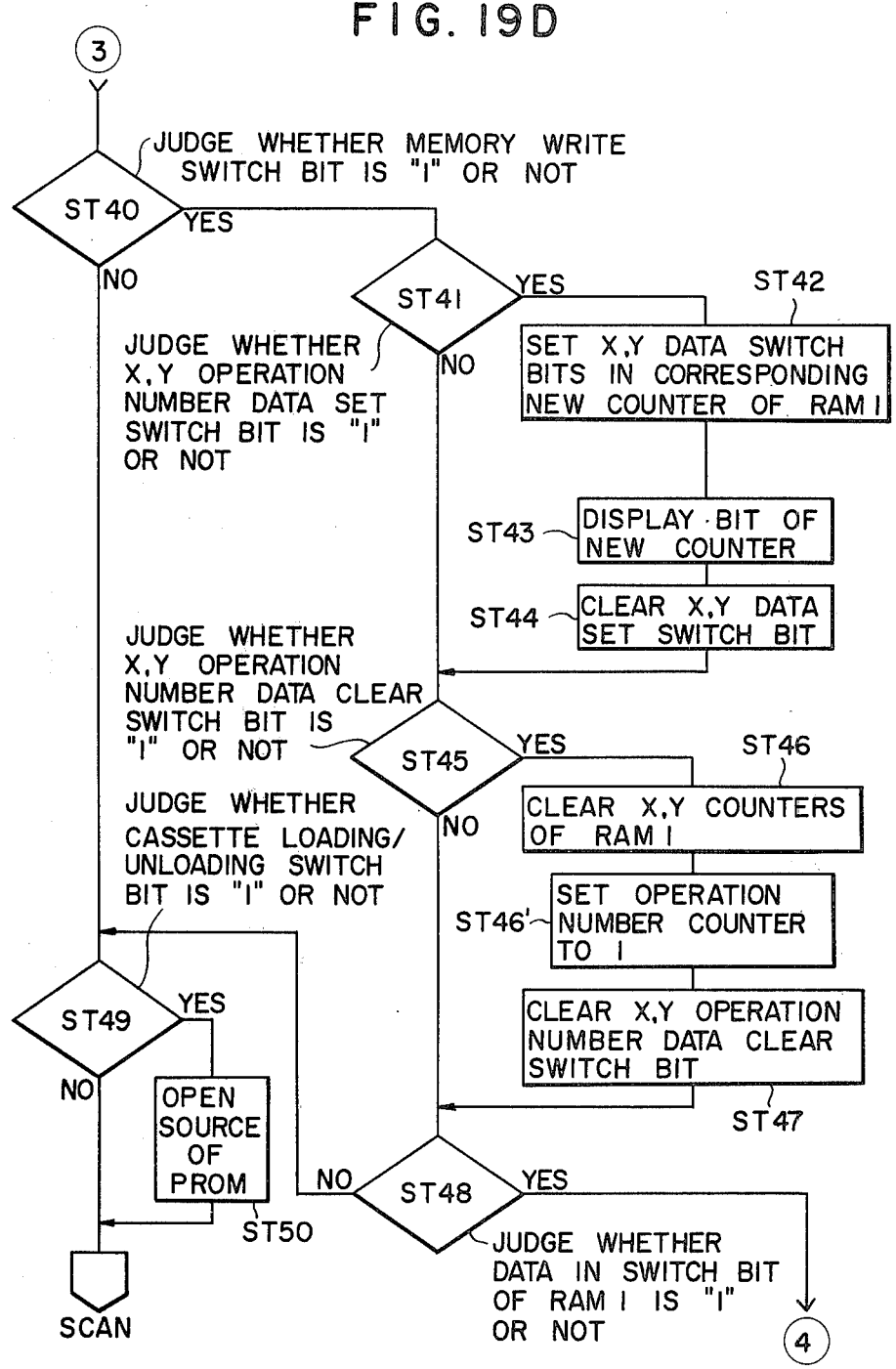

Referring now to FIG. 19C, at step ST33 a judgement is made as to whether the erase confirming switch bit is "1" or not. When the result is YES, the fact that PROM has been erased by the eraser shown in FIG. 12 is confirmed by the process of steps ST34–ST39.

More particularly, at step ST34 a judgement is made as to whether the start switch bit is "1" (ON state) or not. When the result of ST34 is YES check is made as to whether all contents of 0 to last address of PROM have been erased or not at step ST35. When the fact that the contents of all addresses have been erased is confirmed at step ST36, the end lamp is lighted at step ST37. When the result of step ST36 is NO, at step ST38 the checking of the not erased address is stopped and the not erased address is displayed. Then at step ST39 an erasion error lamp is lighted.

When the result of step ST33 is NO, at step ST40 a judgement is made as to whether the memory write switch bit is "1" (ON state) or not, and when the result of this step is YES, process steps ST41–ST48 and ST51–ST63 for writing the data in RAM2 will be executed. When the result of ST40 is NO, a judgement is made as to whether the cassette loading/unloading switch bit is "1" or not at step ST48. If the result of this step is YES, the power source of PROM is opened at step ST50. On the other hand, if the result of ST49 is NO, the routine is returned to scanning.

The process steps of ST41–ST47 correspond to a case wherein data are applied from the data switch on the control panel (FIG. 12). More particularly, at step ST41 a judgement is made as to whether the X, Y operation number data set switch bit is "1" or not, and when the result of this judgement is YES, at step ST42 the bits showing the states of X and Y data switches are set in the corresponding new counter of RAM1. Then at step ST43, the bit of the new counter is displayed by the lamp on the panel. Then, at step ST44, the X, Y data set switch bits of RAM1 are cleared.

When the result of ST41 is NO, and when the step ST44 is completed, at step ST45 a judgement is made as to whether the X, Y operation number data clear switch bits are "1" or not. When the result of this step is YES, at step ST46 the new X, Y counters of RAM1 are cleared. Then at step ST46' the operation number counter is set to 1, and at step ST47 the bits "1" of X, Y operation number data clear switches are cleared.

When the switch data input shown by steps ST42 and ST43 are erroneous, the X, Y operation number data switches are judged ON at step ST45 for erasing such error.

At step ST48 when the data-in switch bit of RAM1 is judged "1" the step is advanced to step ST51 where new and old X, Y data of RAM1 are compared. When the result is YES, at step ST52 new and old data of RAM1 are compared again with respect to the index of control ($D_{11}$–$D_{14}$) and control signal. When they coincide with each other, one is added to the count of the operation number counter of RAM1 at ST54 and then at step ST63 the data-in switch bit of RAM1 is cleared.

When the result of step ST51 or 52 is NO, at step ST53 the old data and the operation number data (24 bits) of RAM1 are written into RAM2. Then, at step ST55 a judgement is made as to whether the bit number of new X, Y data of RAM1 is larger than a predetermined value or not. If the result is NO, 1 is added to the count of the address counter of RAM1 at ST60. Then at step ST61, new X, Y data $D_{11}$–$D_{14}$, $D_{15}$, $D_{16}$ regarding index of control and control signal of RAM1 are transferred to the old area of RAM1. Then, at step ST62, 1 is set in the operation number counter of RAM1 and the step is advanced to step ST63.

When the result of ST55 is YES, the process is transferred to steps ST56–ST58 which are used not only in a case where data are applied from the control panel switch but also in a case where X, Y input data are applied from the joy stick (positioning by the stylus). More particularly, at step ST56 the starting point A and the end point B at which the stylus is positioned according to the sewing pattern are interconnected by a plurality of segments and such segments are selected such that when they are interconnected, the resultant curve will approach a straight line AB. Thus, X, Y data and operation number data corresponding to respective segments are calculated by considering the stitch pitch designated by the thumb wheel and these data corresponding to respective addresses are stored in the other memory area M of RAM1. Then at step ST57, the contents of addresses corresponding to respective segments and the data $D_{11}$–$D_{14}$ (index of control) and $D_{15}$, $D_{16}$ (control signal) (total 24 bits) are written in the RAM2 according to the order of addresses. Then, at step ST58, X, Y data, $D_{11}$–$D_{14}$, $D_{15}$, $D_{16}$ corresponding to the last address (corresponding to a segment containing the end point B) of the memory area M of RAM1 are transferred to the old area of RAM1. After adding 1 to the count of the operation number counter of RAM1 at step ST59, the step is transferred to step ST62 where 1 is set in the operation number counter of RAM1. Finally, at step ST63 the data-in switch bit of RAM1 is cleared.

Figure 19E:
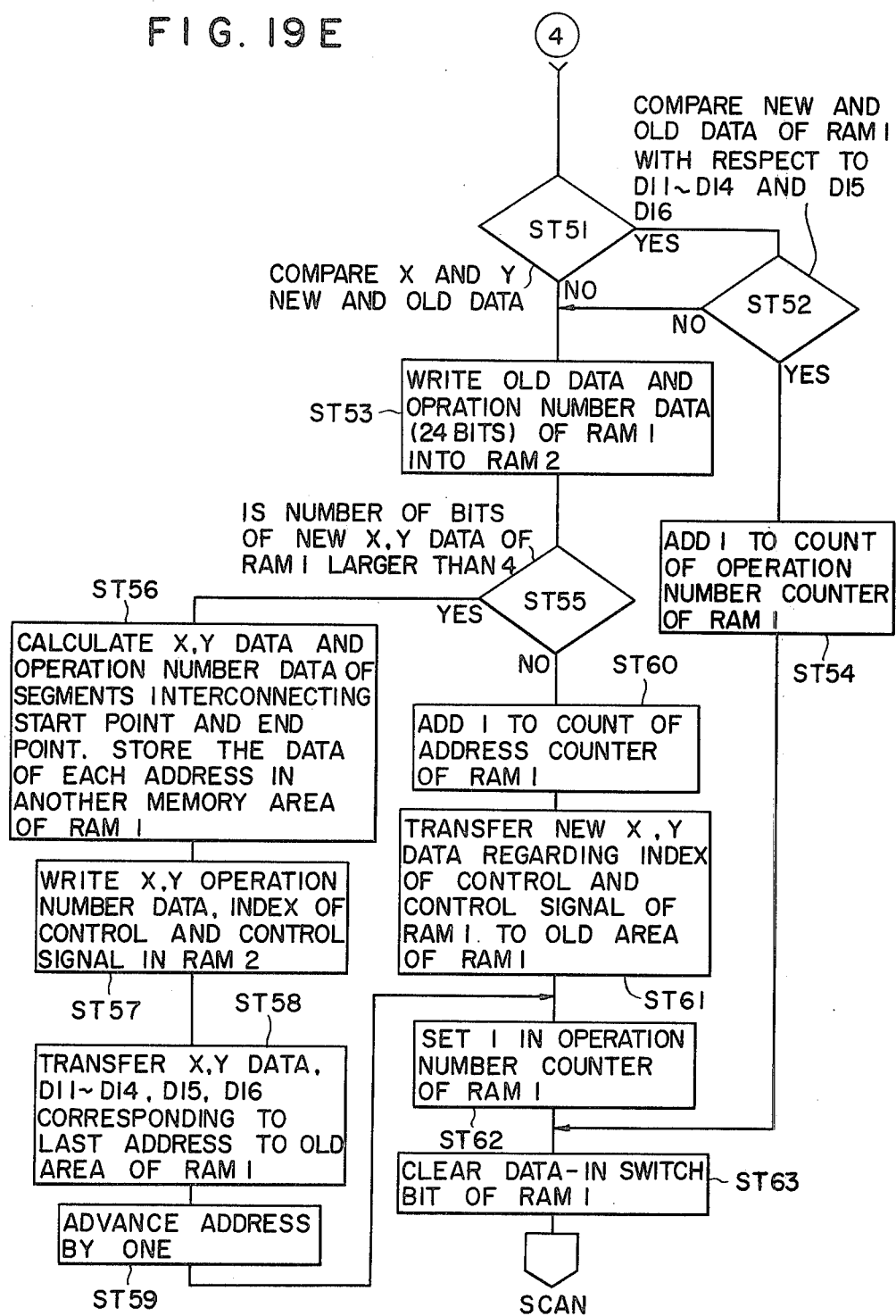

FIG. 19E shows a flow chart of an interrupt call. At step ST1, X, Y input pulses from the joy stick are written in the in-pulse bit area of RAM1. At steps ST2–ST9, the limits of movement in ±X and ±Y directions are checked and the in-pulse bit is supplied to the pulse motor at step ST10. At step ST11 a judgement is made as to whether the memory write switch bit is "1" or not and when the result is YES the in-pulse is algebraically added to the count of the new X, Y data counters of RAM1 whereas when the result of ST11 is NO, the process is returned to the "return" for awaiting the next in-pulse. Instead of using step ST12, a step ST12' may be used in which X, Y ¼ counters are provided for RAM1 for the purpose of making one pulse supplied to the pulse motor at step ST10 to correspond to ¼ pulse at the new data counter of RAM1. With this step ST12', where the amount of movement of one pulse supplied from the joy stick is 0.05 mm, ¼ of one pulse for the movement of 0.05 mm is stored in the new data counter of RAM1.

FIGS. 20, 21A, 21B, 22A, 22B, 23A, 23B, 24A and 24B are flow charts showing the detail of the program memory (for NC machining) shown in FIG. 10. In the case shown in FIGS. 18 and 19, the snap switch of the panel unit is thrown to the side of PROGRAM, but for NC machining it is thrown to the side of CUT.

Figure 20:
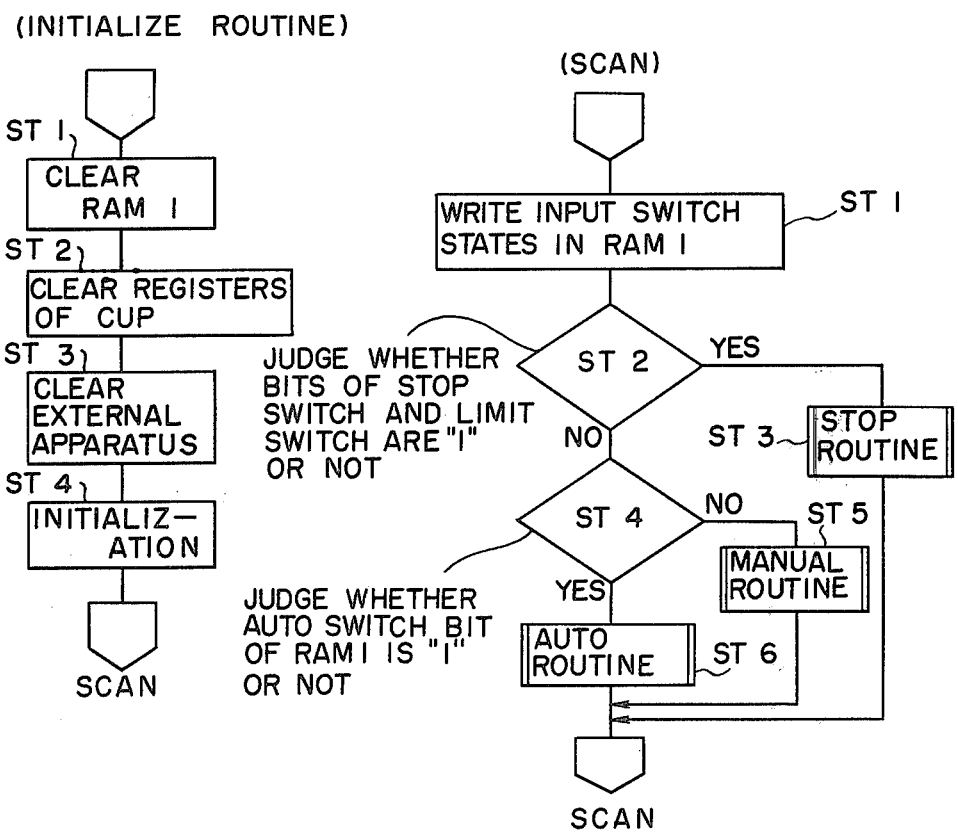
FIG. 20 is a flow chart showing the initializing routine and the scanning routine of the operation steps executed to work the groove profile and openings through a cloth clamping plate by means of the programming apparatus of this invention.

In FIG. 20, the initialize routine is started by closing a power ON or initialize switch and steps ST1 through ST4 are sequentially executed. Upon completion of the initialize routine, a scan routine is executed. At step ST1 of this routine, the states (bits) of input switches (provided for the programmer panel or programming device) are written in RAM1. Then, at step ST2 the bits of stop switch and limit switch are checked and when the result of this step is YES, the process is transferred to stop routine at step ST3. If the result is NO, at step ST4 a judgement is made as to whether the auto switch bit is "1" or not. If the result is NO, the routine is transferred to the manual routine, whereas if the result is YES the routine is transferred to the automatic (AUTO) routine.

The manual routine is executed by making effective the joy stick by transferring the snap switch on the panel unit to the CUT side.

Figure 21A:
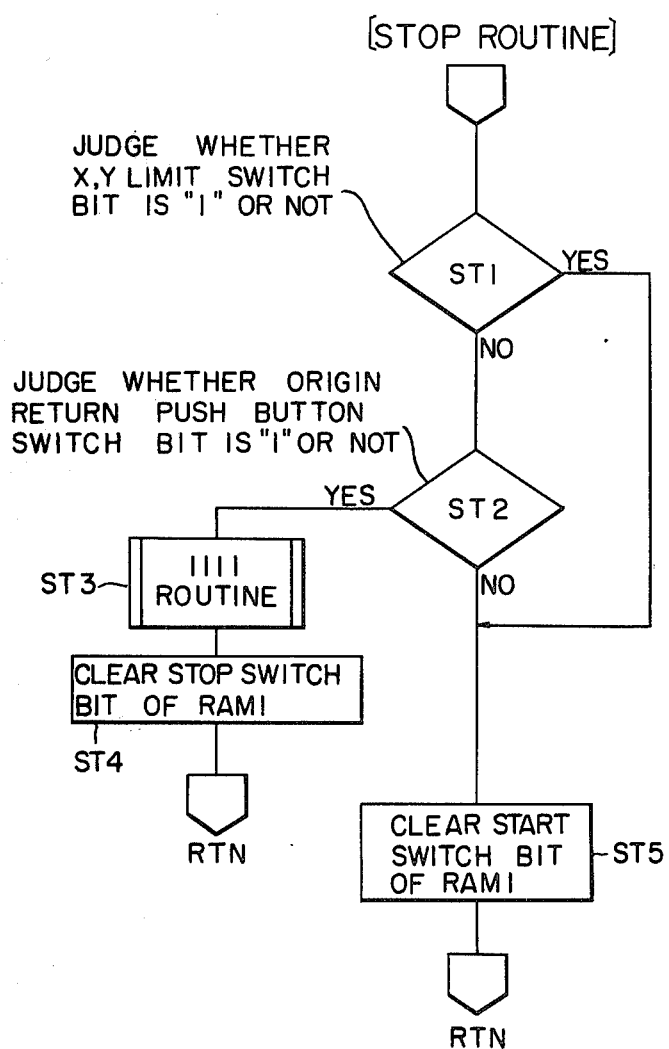
FIGS. 21A and 21B show the stop routine and manual routine of the flow chart.

On the lefthand side of FIG. 21A is shown a flow chart of the stop routine comprising steps ST1–ST5. At step ST1, a judgement is made as to whether the bits of the limit switches for the directions of ±X and ±Y are "1" or not, and when the result is YES, the start switch bit of RAM1 is cleared at step 5. If NO, at step ST2 a judgement is made as to whether the switch bit of the origin returning push button ORG is "1" or not. When the result is YES, the routine is transferred to the 1111 routine at step ST3 followed by step ST4 where the stop switch bit of RAM1 is cleared. If the result of step ST2 is NO, the process is advanced to step ST5.

On the righthand side of FIG. 21A is shown the flow chart of the manual routine including steps ST1–ST11. In this case, the snap switch is thrown to the PROGRAM side from the CUT side. At step ST1 a judgement is made as to whether the content of the in-pulse data area of RAM1 is equal to the content of the SERVO data area of RAM1 or not. If the result is YES, the routine is returned to "return" routine, whereas when the result is NO, at step ST2, the bits of in-pulse +X, −X, +Y and −Y directions are transferred to the servo area of RAM1. Then at steps ST3–ST9, the bits of limit switches for respective directions are checked. When the results of steps ST3–ST9 are YES, respective bits which have been transferred to the servo area at step ST2 are cleared at steps ST4–ST10, respectively. At step ST11, the bits in the servo area are released and applied to X,Y axis driving motors. Thus, at steps ST1–ST11, the table 112 or movable body 117 are driven by the pulse motors within a limit of movement by manipulating the joy stick while the snap switch is thrown to the PROGRAM side. However, as the bit of the memory write switch is maintained at "0" the pulses released from the servo area will not be applied to the X, Y data counters and to the X, Y absolute counters of RAM1.

Figure 21B:
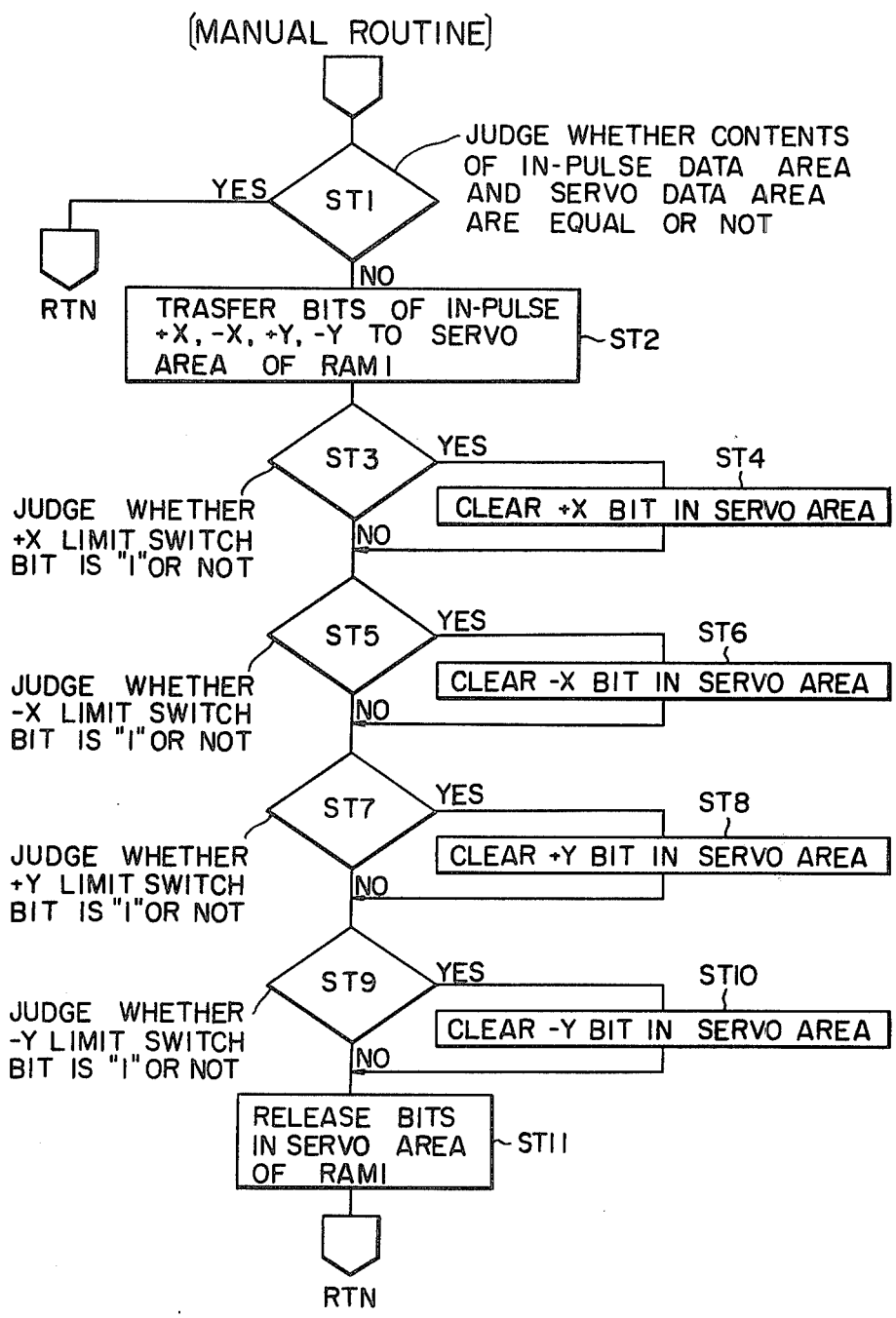
Figure 21C:
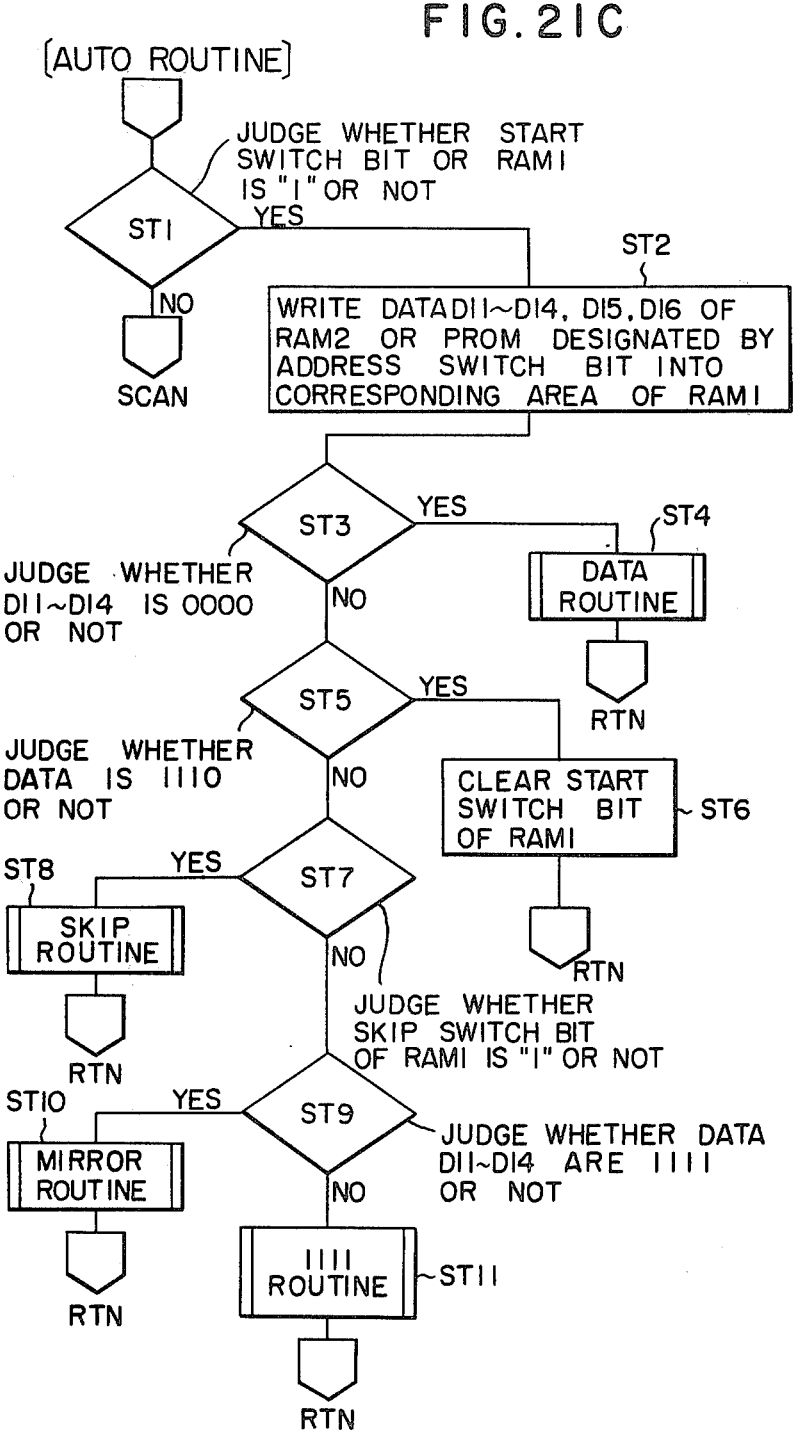
FIG. 21C shows the auto routine of the flow chart.

The auto routine shown in FIG. 21B will now be described. At this time, the snap switch on the panel unit is thrown to the CUT side. At step ST1, a judgement is made as to whether the start switch bit of RAM1 is "1" or not, and when the result is NO, the process is returned to the scan routine. If the result is YES, at step ST2, data $D_{11}$–$D_{14}$ (index of control) and $D_{15}$, $D_{16}$ (control signal) of RAM2 or PROM designated by the address set switch bit (8 bits) are written into the corresponding area of RAM1. Then, at step ST3, a judgement is made as to whether data $D_{11}$–$D_{14}$ written into RAM1 is a data code 0000 or not. If the result is YES, at step ST4, the data routine is executed. On the other hand, if the result is NO, at step 5, a judgement is made as to whether the data is the optional code 1110 or not. If the result of step ST5 is YES, the start switch bit of RAM1 is cleared at step ST6, thus stopping the movement of the movable body and the Y table 112, hence the cloth clamping plate. At this time, the end mill 109 is raised and then lowered. When the result at step ST5 is NO, a judgement is made at step ST7 as to whether the skip switch bit of RAM1 is "1" or not. If the result of this step is YES, the skip routine is executed at step ST8 whereas when the result is NO, a judgement is made at step ST9 as to whether the data $D_{11}$–$D_{14}$ is 1111 or not. When the result of this step is YES, the 1111 routine is executed at step ST11. If NO, the mirror routine is executed at step ST10.

FIG. 22A shows the flow chart of the mirror routine. At step ST1 of this routine a judgement is made as to whether data $D_{11}$–$D_{14}$ (index of control) which have been written into RAM1 from RAM2 or PROM is equal to the set bit of the mirror code of RAM1 (which is set by the thumb wheel of the panel unit and represents the size) or not. If the result is YES, "1" is set in the mirror bit area of RAM1 at step ST2. On the other hand, if the result is NO, the address adjusting routine is executed at step ST3.

At the step ST1 of the address adjusting routine, a judgement is made as to whether the mirror bit of RAM1 is "1" or not. If the result is YES, 1 is subtracted from the count of the address counter of RAM1 at step ST2. If NO, 1 is added to the count at step ST3, whereby a mirror coincidence signal M is produced (mirror bit="1"). Then, the address up mode is changed to the address down mode.

Figure 22B:
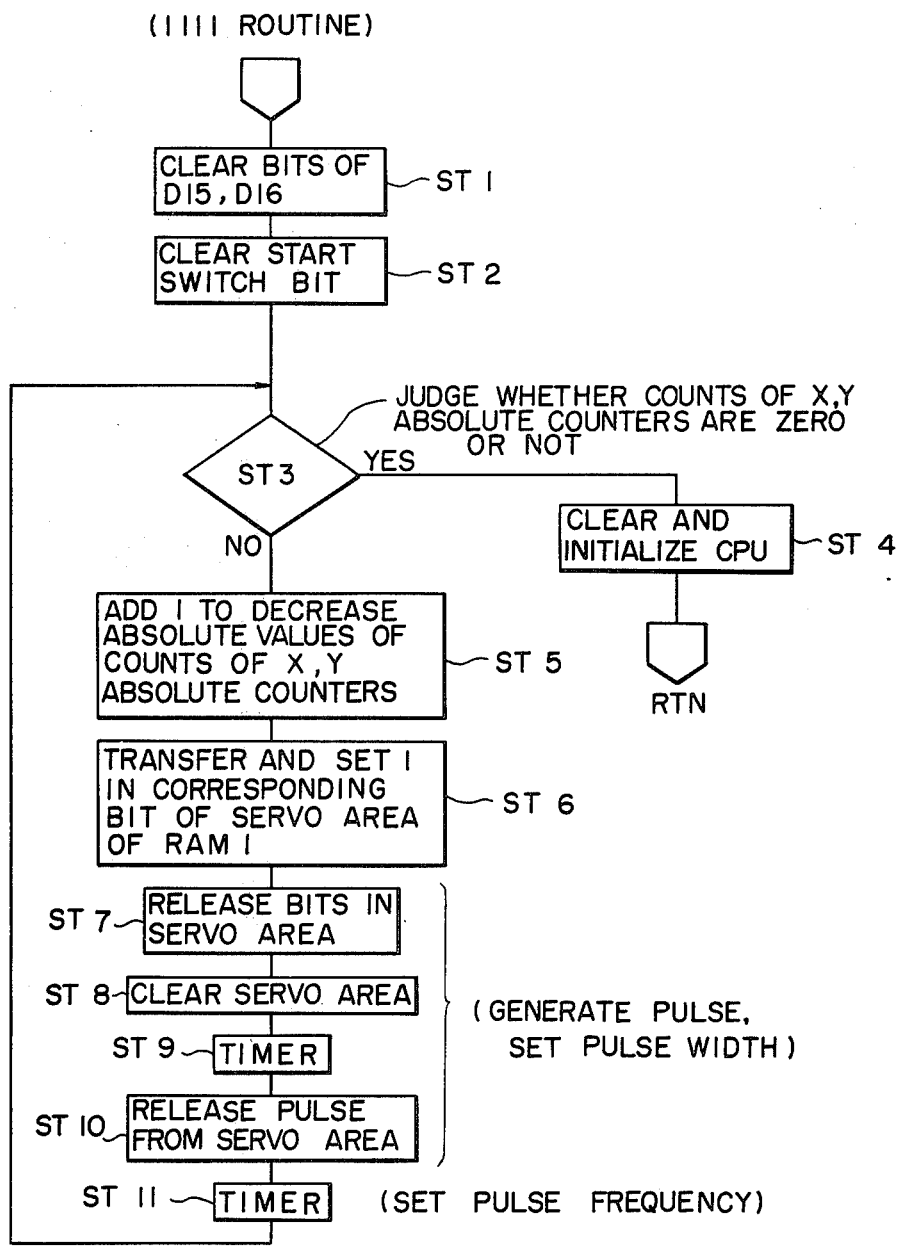
FIG. 22B shows the stop code routine.

FIG. 22B shows the stop code (1111) routine. At step ST1 of this routine bits of $D_{15}$ and $D_{16}$ of RAM1 is cleared and at step ST2, the start switch bit of RAM1 is cleared. Then, at step ST3, a judgement is made as to whether the counts of X,Y absolute counters of RAM1 are 0 or not.

If the result is YES, the CPU of RAM1 is cleared and initialized at step ST4. If NO, at step ST5 1, is added to decrease the absolute values of the counts of respective absolute counters. Then, at step ST6, the "one" added at step ST5 is transferred and set in a corresponding bit of the servo area of RAM1. Then at step ST7, respective bits of servo area are released for driving the pulse motors.

At steps ST8–ST10 the pulse width is determined, and at step ST11, the frequency of the pulse is determined to be lower than the response frequency of the pulse motors. To this end, the pulses are delayed a definite time by timers.

Figure 23A:
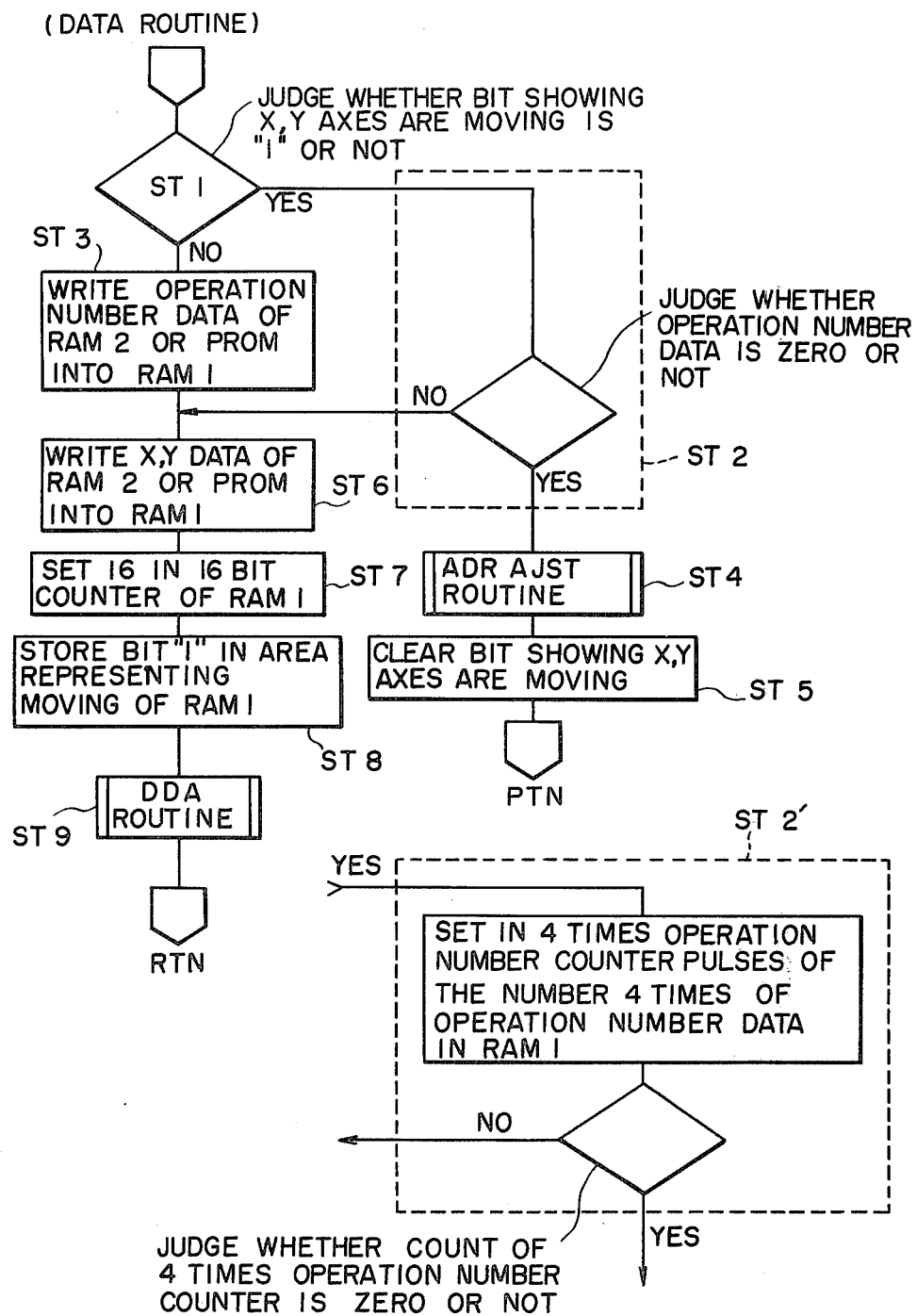
FIG. 23A shows the data routine.

FIG. 23A shows the data routine in which at step ST1 a judgement is made as to whether the data area bit showing that X, Y axes are moving is "1" or not. If the result is YES, a judgement is made as to whether the operation number data of RAM1 is zero or NOT. When the result of ST2 is YES, the address adjusting routine is executed at step ST4. In the address up mode, 1 is added to the count of the address counter, whereas in the case of the address down mode, 1 is subtracted. Then, at step ST5 the bit showing that X, Y axes are moving is cleared. If the result of step ST1 is NO, at step ST3 the operation number data of RAM2 or PROM1 is written into RAM1. Then, at step ST6, the X, Y data (including sign) of RAM2 or PROM written into RAM1 at step ST7 16 is set in 16 bit counter of RAM1. At step ST8, bit "1" is stored in the area representing moving. Finally at step ST9, the DDA routine shown in FIG. 23B is executed.

In this routine, at step ST1, the integrand and remainder are added together for both X and Y axes. At step ST2, a judgement is made as to whether the mirror bit of RAM1 is "1" or not. If the result is YES, at step ST3, the Y sign bit of RAM1 is reversed. Then at step ST4, a judgement is made as to whether the X, Y sign bits are "1" or not. When the result of step ST4 is YES, that is when the sign is negative, steps ST5 and ST6 are executed, whereas when the result is NO, that is when the sign is positive, steps ST7 and ST8 are executed. At these steps the "overflow" is obtained by the addition of the integrand and the remainder. Then at steps ST9–ST12, respective bits in the servo area are released and applied to respective pulse motors. At step ST13, 1 is subtracted from the count of the 16 bit counter, and at step ST14, a judgement is made as to whether the content of the 16 bit counter is zero or not. When the result is YES, at step ST15, 1 is subtracted from the count of the operation number counter, whereas when the result is NO, at step ST16 an overflown pulse is applied to the pulse motors by means of a timer within a response range of the motors. Thereafter, the process is returned to the return routine for executing again the DDA routine.

As shown at the bottom of FIG. 23A, when the step ST2 is substituted by step ST2' in which an area of 4 times operation number counter is provided for RAM, it is possible to supply pulses to the pulse motors of the number four times of the number of pulses stored in RAM2 or PROM. This means that the programming apparatus of this invention can be applied to a driving system in which X, Y axis pulse motors are moved 0.05 mm per one pulse. Further, as shown in FIG. 23B, in the modified step ST15' of the DDA routine, 1 is subtracted from the count of the 4 times operation number counter to correspond to step ST2'. These steps ST2' and ST15' are executed concurrently with the step ST12' shown in FIG. 19F.

Figure 24A:
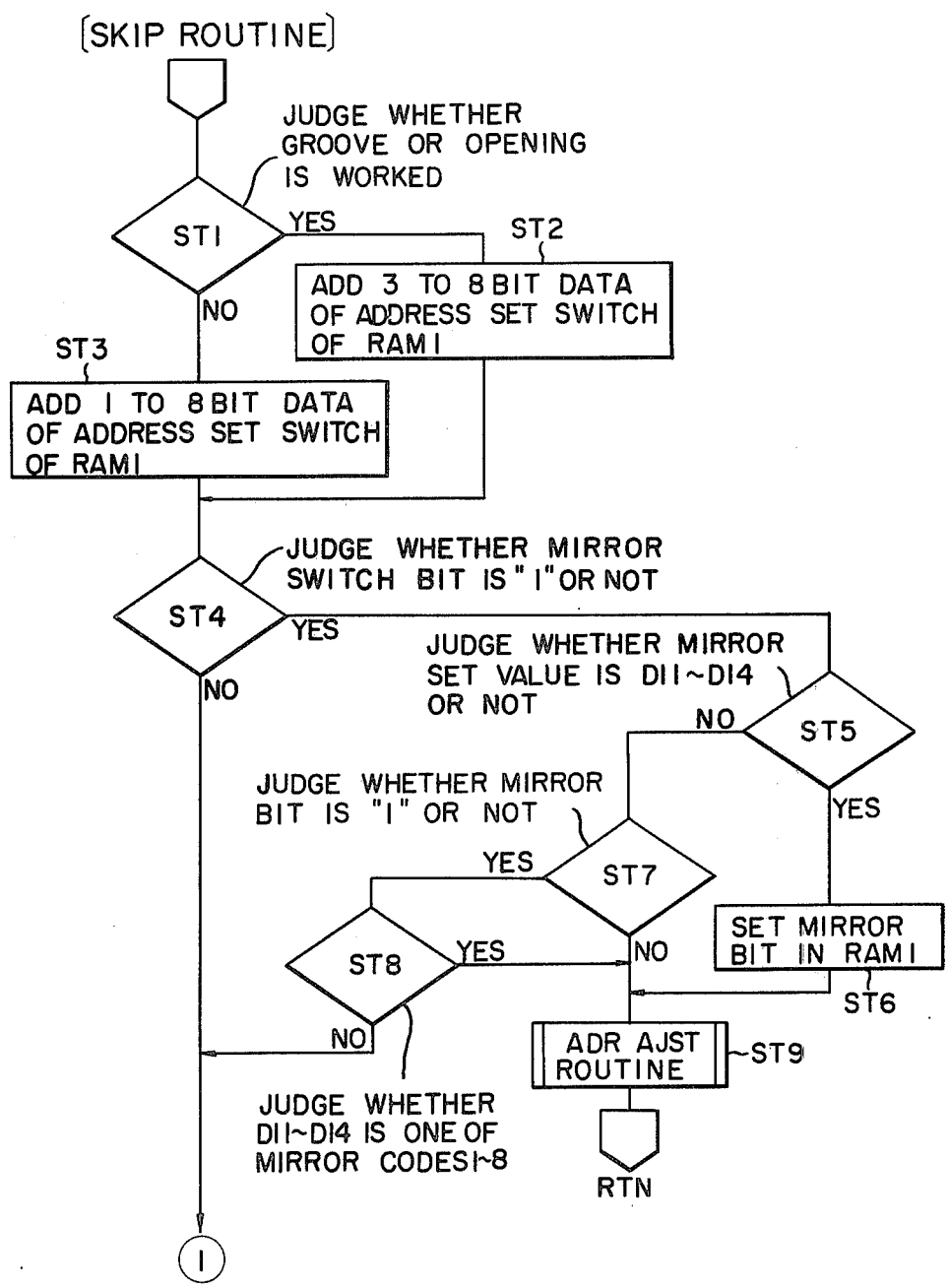
FIGS. 24A and 24B show a skip routine.
Figure 24B:
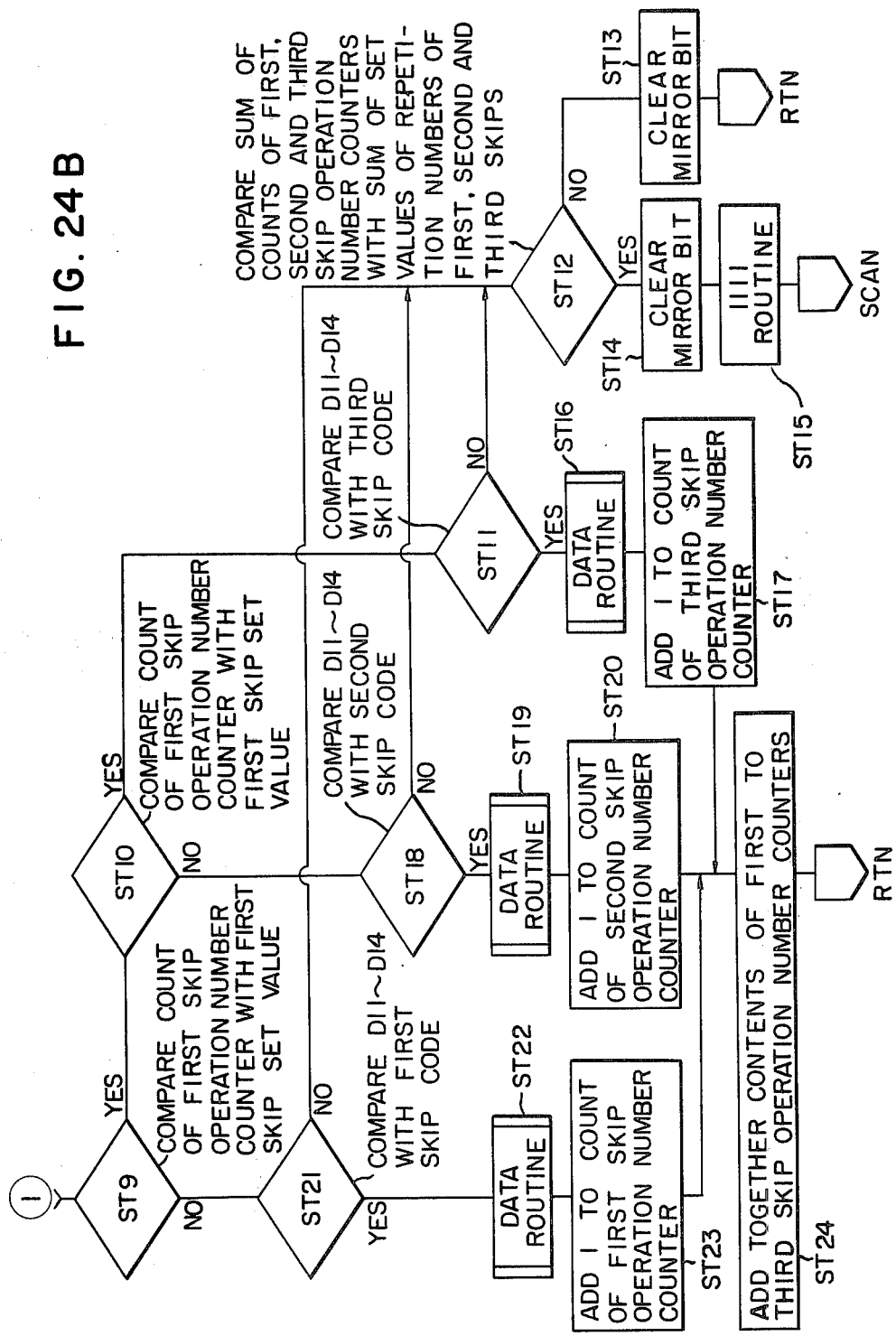

FIGS. 24A and 24B show the skip routine. At step ST1, judgement is made as to whether the groove or openings (including the working origin) are worked. To this end, switches for working openings and grooves are mounted on the panel or the fact that the address (8 bits) have been set for the purpose of cutting grooves is stored in the corresponding area of RAM1, and thereafter the bit of this area is checked.

When the result of step ST1 is YES, 3 is added to the 8 bit data of the address set switch of RAM1 at step ST2 whereby the address counter of RAM1 is reset and the address counter is set with the sum of the 8 bit data of the address set switch of RAM1 and 3 or 1. At step ST4, a judgement is made as to whether the mirror switch bit is "1" or not and when the result is YES, at step ST5, the mirror set value of RAM1 [one of the mirror codes 1-8 (0001-1000) set by the thumb wheel switch] is compared with the index of control $D_{11}$–$D_{14}$ of the address of RAM2 or PROM which is read. If the result of step ST5 is YES, a mirror bit is set in RAM1 at step ST6 and then the address adjusting routine is executed at step ST9. On the other hand, when the result of step ST5 is NO, a judgement is made as to whether the mirror bit is "1" or not at step ST7. When the result of this step is NO, the address adjusting routine is executed at step ST9. When the result of step ST7 is YES, at step ST8, a judgement is made as to whether said read out data $D_{11}$–$D_{14}$ is one of the mirror codes 0001-1000 (that is, 1-8) or not. When the result is YES, the process is advanced to step ST9. When the result of step ST8 is NO, the process is transferred to the step ST9' shown in FIG. 24B.

At this step ST9', the count of the first skip operation number counter of RAM1 (at first 0 by initialization) is compared with the first step repetition number set value of RAM1 (given by $D_{15}$ and $D_{16}$ of the first skip code). If the result is NO, at step ST21 a judgement is made as to whether data $D_{11}$–$D_{14}$ are the first skip code 1001 or not. If the result is YES, the data routine is executed at step ST22 to read out the data $D_{17}$–$D_{38}$ at that address for driving the X, Y axis pulse motors. Thereafter, at step ST23, 1 is added to the count of the first skip operation number counter. Then at step ST24, the counts of the first, second and third skip operation number counters are added together. When the result of step ST21 is NO, at step 12, the sum of the counts of the first, second and third skip operation number counters is compared with the sum of the set values of the repetition numbers of the first, second and third skip codes, and when the result is YES, the mirror bit is cleared at step ST14, and then the stop code (1111) routine is executed at step ST15. When the result of step ST12 is NO the mirror bit is cleared at step ST13.

When the result of step ST9' is YES, the step is advanced to step ST10 and then to steps ST18, ST19 and ST20 which are similar to steps ST21, ST22 and ST23. At step ST10, the count of the second skip operation number counter is compared with the second skip set value. When the result of step ST10 is YES, steps ST11, ST16 and ST17 are executed with reference to the third skip code and then the process is advanced to step ST24.

The flow chart shown in FIG. 24B shows that at first only the first skip code is made effective, that when the skip shift is performed by a number equal to the repetition number ($D_{15}$, $D_{16}$) of the first skip code the second skip code (1010) is made effective, that when the skip shift is performed by a number equal to the repetition number of the second skip code the third skip code (1011) is made effective and that when the shift of the third skip is performed by a number equal to the repetition number of the third skip code the result of comparison at step ST12 becomes YES.

While in the embodiment described above, a magnifying lens was used as the stylus, it is also possible to use a needle for marking stitch positions.

Furthermore instead of raising the end mill from beneath the programmer table it is also possible to mount a tool support above the table for supporting the end mill. It is also possible to mount a scribing instrument on the stylus to scribe a pattern curve by the movement of the movable body and the Y table in X and Y directions. For programming, the foot switch 153 shown in FIG. 1 performs the same function as the memory write push button on the program panel and it produces an instruction which advances the address by one when the data of PROM or RAM2 are read out for NC machining.

Although in the foregoing embodiment a microcomputer system was used and steps of programming the computer and the steps of NC machining have been described, it can be readily understood from FIG. 9 (circuit block for NC machining) that the invention can also be realized by a circuit constituted by hardwares.

In summary, the invention has the following advantages.

1. Since the data programmed on the programmer table is firstly stored in RAM2, before transferring the data from RAM2 into PROM it is possible to scribe a pattern by a scribing instrument by reading the data out of RAM2 for comparing the scribed pattern with the original pattern utilized in the programming operation. That is, debugging is possible.

2. In addition to the programming operation it is possible to form grooves and openings at the working origin MG through the cloth clamping plate immediately after programming.

3. Similar to the data for the start point $d_1$ of the pattern groove, the positional data for forming the opening at the working origin on the cloth clamping plate is given by the distance from the same program origin so that it is possible to make accurate the relative position of the working origin MG and pattern groove with the result that when the cloth clamping plate worked in this manner is used on the automatic sewing machine the needle is moved relatively along the center line of the groove.

4. Either one of the cloth clamping plate and the stylus can be removably mounted on the movable body by a chuck mechanism so that the programming operation and the NC machining is interchangeable.

5. Since the recording medium (RAM2 or PROM) is provided with memory areas for the index of control and the operation number data it is possible to decrease the number of addresses necessary for programming and to simplify the read out steps and circuits.

6. The number of addresses can also be decreased by using mirror codes and skip codes for representing the index of control whereby the efficiency of the programming operation can be greatly improved.

7. As a grid shaped region is provided at the center of the magnifying lens which is used as a stylus, positioning of the stylus can be made readily and accurately.

8. During the programming operation, since the X, Y operation number data can be applied not only from the joy stick but also from the panel unit, it is possible to store the data by means of a switch provided that the X, Y operation number data is known.

9. Since a microcomputer system is used the programming of a straight portion of a sewing pattern can be readily performed by merely positioning the stylus at the start and end points, and by automatically forming the portions intermediate the start and end points by the X, Y operation number data contained in one or more addresses. For this reason it is possible to greatly simplify the programming operation and save time and labour when programming a pattern which is made up of a plurality of linear segments as in a collar and cuffs of a shirt.

In the embodiment, since the operation number data up to 99 is used it is possible to program a straight portion having a maximum length of 198 mm (with a stitch pitch of 2 mm) by two address designations.

10. As a PROM erasing means is provided for the panel unit it is possible to regenerate the PROM which has been misprogrammed or used.

11. Since a reduction gear is provided for the pulse motor, and since a ¼ counter and a 4 times operation number data counter are provided the pulse width 0.2 mm on the sewing machine is reduced to 0.05 mm on the programmer table so that it is possible to smoothly feed the end mill when it is used to cut a groove through a cloth clamping plate.

12. As it is possible to provide an address set switch (8 bits) for instructing a desired working pattern to PROM (RAM2), where a plurality of patterns are stored in a PROM, it is possible to make an address designation for any pattern irrespective of the order of addresses.

We claim:

1. In a programming apparatus for an automatic sewing machine comprising:
   a programmer table for mounting a sheet member provided with marks and positions corresponding to stitch positions along a sewing pattern curve,
   a moveable member having a connecting member for removably mounting a stylus which is to be positioned at said marks of said sheet member onto the table,
   a drive means including pulse motors for moving for said movable member on said table in the X and Y directions of rectangular coordinates,
   first control means including:
      pulse generating means for generating pulses supplied to said pulse motors,
      memory medium including a memory area for storing a number of pulses which are applied to said pulse motors for moving said stylus between adjacent ones of said mark along said sewings pattern curve corresponding to at least one address, and
      a ROM writer for transferring the contents of said memory medium to a nonvolatile memory means,
   the improvement which comprises,
   second control means including:
      means for reading out the content for said memory medium or said nonvolatile memory means for producing an instruction pulse train to relatively move said movable member, and
      circuit means for supplying said instruction pulse train to said pulse motors, thus moving said movable member in accordance with the content stored in said memory means or in said nonvolatile memory means, and
   means for forming a pattern contour corresponding to the content of said memory medium or nonvolatile memory means on a not yet worked cloth clamping plate mounted on said movable member by said connecting member during the operation of said second control means.

2. The programming apparatus according to claim 1 wherein said nonvolatile memory means comprises a read only memory means (ROM) or a programmable read only memory means (PROM).

3. The programming apparatus according to claim 1 wherein said pattern contour forming means comprises a cutting tool mounted to be movable vertically with respect to the surface of said programmer table.

4. The programming apparatus according to claim 1 wherein said pattern contour forming means comprises a scribing instrument.

5. The programming apparatus according to claim 1 wherein said stylus comprises a magnifying lens formed with criss-cross lines at the central portion and grids near the cross point of said criss-cross lines, the grids being parallel with said criss-cross lines and having a spacing equal to a minimum distance of relative movement of a needle of the sewing machine.

6. The programming apparatus according to claim 1 wherein said memory medium has a memory area for storing an operation number data determined by the number of pulses between adjacent marks, said number being related to a predetermined stitch pitch of said sewing machine, and said memory area corresponding to respective addresses of said operation number data.

7. The programming apparatus according to claim 1 wherein said memory medium is formed with a code area representing an index of control and corresponding to respective addresses, said code area containing a stop code, a data code and an optional stop code.

8. The programming apparatus according to claim 1 wherein said code area representing said index of control contains a plurality of mirror codes and wherein either one of said first and second control means includes mirror set means for designating one of said mirror codes.

9. The programming apparatus according to claim 7 wherein said code area representing said index of control contains a plurality of skip codes and wherein either one of said first and second control means includes a decode instruction switch means for skip data.

10. The programming apparatus according to claim 1 wherein either one of said first and second control means includes address set switch means.

11. The programming apparatus according to claim 1 wherein said first and second control means are constituted by a microcomputer system comprising
   (1) a bus line,
   (2) a central processing unit connected to said bus line,
   (3) a first memory medium (RAM2) connected to said bus line and adapted to store a content to be written into said nonvolatile memory means (ROM or PROM),
   (4) a second memory medium (RAM1) connected to said bus line, said second memory medium being provided with memory areas corresponding to respective bit data representing driving pulses applied to said pulse motors, various input and output switch signals produced by switches of said programming apparatus, and an address count value designating address of said first memory medium (RAM2), and
   (5) a fourth memory medium (ROM or PROM) acting as a program memory device connected to said bus line, said fourth memory medium storing a decoded instruction group produced by decoding the content of said first memory medium (RAM2) for supplying driving pulse trains to said pulse motors.

12. The programming apparatus according to claim 1 which further comprises a first pulse frequency dividing gate circuit constructed such that it establishes a relationship $$\delta 1 = 1/N \cdot \delta 2$$

where δ1 represents the minimum amount of movement of said stylus caused by a driving pulse instruction to said pulse motors, δ2 a minimum amount of movement of said cloth clamping plate on said automatic sewing machine corresponding to said δ1, and N a positive integer, that for programming operation said gate circuit applies XP and YP drive pulses to said pulse motors for driving said movable member in the X and Y directions respectively between adjacent marks thereby storing 1/N·XP and 1/N·YP pulses in register areas of said recording medium, and a second pulse frequency multiplying gate circuit which, when relatively moving said movable body by reading the content of said recording medium or said nonvolatile memory means, converts said X and Y axis data 1/N·XP and 1/N·YP to XP and YP respectively.

13. The programming apparatus according to claim 1 wherein said first control means comprises means for erasing said nonvolatile memory means.

* * * * *